US009577793B2

United States Patent
Davydov et al.

(10) Patent No.: US 9,577,793 B2
(45) Date of Patent: Feb. 21, 2017

(54) SOFT BUFFER MANAGEMENT

(71) Applicant: Intel Corporation, Santa Clara, CA (US)

(72) Inventors: Alexei Vladimirovich Davydov, Nizhny Novgorod (RU); Gregory Vladimirovich Morozov, Nizhny Novgorod (RU); Vadim Sergeyevich Sergeyev, Nizhny Novgorod (RU); Alexander Alexandrovich Maltsev, Nizhny Novgorod (RU)

(73) Assignee: INTEL CORPORATION, Santa Clara, CA (US)

( * ) Notice: Subject to any disclaimer, the term of this patent is extended or adjusted under 35 U.S.C. 154(b) by 125 days.

(21) Appl. No.: 14/579,974

(22) Filed: Dec. 22, 2014

(65) Prior Publication Data

US 2016/0088635 A1 Mar. 24, 2016

Related U.S. Application Data

(60) Provisional application No. 62/054,337, filed on Sep. 23, 2014.

(51) Int. Cl.
*H04L 1/18* (2006.01)
*H04W 88/08* (2009.01)

(52) U.S. Cl.
CPC .......... *H04L 1/1812* (2013.01); *H04W 88/08* (2013.01)

(58) Field of Classification Search
CPC ............................. H04L 1/1812; H04W 88/08
See application file for complete search history.

(56) References Cited

U.S. PATENT DOCUMENTS

| 2013/0294367 | A1* | 11/2013 | Jalloul | H04W 72/082 370/329 |
| 2014/0010173 | A1* | 1/2014 | Zakrzewski | H04W 8/26 370/329 |
| 2015/0124740 | A1* | 5/2015 | Chen | H04W 16/14 370/329 |

OTHER PUBLICATIONS

3GPP TS 36.213, V12.2.0 (Jun. 2014); 3rd Generation Partnership Project; Technical Specification Group Radio Access Network; Evolved Universal Terrestrial Radio Access (E-UTRA); Physical Layer Procedures (Release 12); Jun. 2014; 207 pages.

(Continued)

*Primary Examiner* — Mohammad Anwar
(74) *Attorney, Agent, or Firm* — Schwabe, Williamson & Wyatt, P.C.

(57) ABSTRACT

Soft buffer management circuitry is provided for use in a device of a wireless communication system. The soft buffer management circuitry has input circuitry for receiving information relating to an aggregated carrier comprising a plurality, $N^{DU/UL}_{cells}$, of configured component carriers. Control circuitry is provided for prioritizing allocation of storage in the soft buffer depending on a carrier index value indicating a prioritization of a corresponding component carrier relative to the other configured component carriers. The buffer is partitioned into a number min ($N_C$, $N^{DL/UL}_{cells}$) partitions, where $N_C$ gives a number of carriers for which soft buffer storage is to be prioritized. A UE comprising the soft buffer management circuitry and a soft buffer management method are also provided.

22 Claims, 12 Drawing Sheets

(56) References Cited

OTHER PUBLICATIONS

3GPP TS 36.212, V12.2.0 (Sep. 2014); 3rd Generation Partnership Project; Technical Specification Group Radio Access Network; Evolved Universal Terrestrial Radio Access (E-UTRA); Multiplexing and Channel Coding (Release 12); Sep. 2014; 89 pages.

3GPP TS 36.306, V12.1.0 (Jun. 2014); 3rd Generation Partnership Project; Technical Specification Group Radio Access Network; Evolved Universal Terrestrial Radio Access (E-UTRA); User Equipment (UE) Radio Access Capabilities (Release 12); Jun. 2014; 30 pages.

* cited by examiner

SOFT BUFFER MANAGEMENT

CROSS REFERENCE TO RELATED APPLICATIONS

The present application claims priority to U.S. Provisional Patent Application No. 62/054,337 filed 23 Sep. 2014, entitled "HARQ SOFT BUFFER MANAGEMENT FOR LTE UNLICENSED", the entire disclosure of which is hereby incorporated by reference.

TECHNICAL FIELD

Embodiments relate to soft buffer management.

BACKGROUND

Wireless mobile communication technology uses various standards and protocols to transmit data between a node (e.g., a transmission station) and a wireless device (e.g., a mobile device). Some wireless devices communicate using orthogonal frequency-division multiple access (OFDMA) in a downlink (DL) transmission and single carrier frequency division multiple access (SC-FDMA) in an uplink (UL) transmission. Standards and protocols that use orthogonal frequency-division multiplexing (OFDM) for signal transmission include the third generation partnership project (3GPP) long term evolution (LTE) and LTE-Advanced (LTE-A).

In 3GPP radio access network (RAN) LTE and LTE-A systems, the node can be a combination of Evolved Universal Terrestrial Radio Access Network (E-UTRAN) Node Bs (also commonly denoted as evolved Node Bs, enhanced Node Bs, eNodeBs, or eNBs) and Radio Network Controllers (RNCs), which communicate with the wireless device, known as a user equipment (UE). Examples of a UE include a mobile terminal, a tablet computer, a personal digital assistant (PDA) and a machine-type communication (MTC) device. A downlink (DL) transmission can be a communication from the node (or eNodeB) to the wireless device (or UE), and an uplink (UL) transmission can be a communication from the wireless device to the node. Instead of communication via eNodeBs, communication between wireless equipment can be performed using peer-to-peer or device-to-device communication. A wireless equipment includes at least a UE, a picocell, a femtocell and a relay node.

As mobile technology advances, there is a requirement to provide increasing peak data throughput to meet user demand, for example to provide high data-rate services. Some services, such as Voice over Internet Protocol (VoIP) are delay sensitive and should respect Quality of Service (QoS) constraints.

Carrier aggregation allows a single wireless connection to use multiple radio frequency (RF) carriers, known as Component Carriers (CCs) and increases channel bandwidth so that peak and average throughput can be increased. LTE Release 10 version defines signaling to support up to five component carriers to give a maximum combined channel bandwidth of up to 100 MHz. Component carriers can be intra-band contiguous, intra-band non-contiguous or even located in different bands (inter-band non-contiguous). Carrier aggregation is applicable to both uplink and downlink directions and to both Frequency Division Duplex (FDD) and Time Division Duplex (TDD).

Carrier aggregation is considered as one of the main approaches to increase data rate performance of LTE-A systems and beyond. There are a large number of Release-10 UEs already available on the market that support aggregation of two carriers. It is expected that demands of carrier aggregation (CA) capable UEs with aggregation of multiple carriers in the future will become even higher. For example, LTE with licensed-assisted access (also known as LTE for unlicensed spectrum) may operate a with large number component carriers that may be aggregated at the UE to increase the peak data rate.

Carrier aggregation categorizes cells as primary cells and secondary cells. The primary cell is the cell upon which the UE performs an initial connection establishment and each wireless connection has a single primary cell that uses a primary radio frequency (RF) carrier that can be changed during a handover procedure. One or more secondary cells are configured after connection establishment to provide additional radio resources on a respective secondary RF carrier. Although the RF carriers are typically licensed carriers (e.g. LTE or LTE-A), as mentioned above the secondary RF carriers could use unlicensed RF spectrum for supplemental downlink and/or uplink capacity. Examples of unlicensed frequencies that could be utilized for carrier aggregation are 5 GHz, 2.4 GHz and 5150-5350 MHz.

Automatic Repeat reQest (ARQ) is a retransmission protocol where the receiver checks for errors in the received data and upon detection of an error, discards the data and requests retransmission from the sender. Hybrid ARQ (HARQ) is a retransmission protocol in which, if an error in received data is detected, the receiver buffers the data and requests retransmission from the sender. An HARQ receiver improves performance of the retransmissions by combining the re-transmitted data with the buffered data prior to channel decoding and error detection. The Media Access Control (MAC) layer uses an HARQ protocol. In the case of carrier aggregation, an HARQ entity is required for each of the plurality of configured carriers of the aggregated carrier. A "soft buffer" is required to buffer encoded data ("soft bits") of transport blocks in which the receiver has detected an error, so that the data combining can be performed to improve decoding efficiency. As the number of component carriers increases, the corresponding increasing requirement for soft-buffer capacity can become problematic.

BRIEF DESCRIPTION OF THE DRAWINGS

Embodiments described herein are illustrated, without limitation, by way of example, in the accompanying drawings.

DESCRIPTION OF EMBODIMENTS

Figure 1:
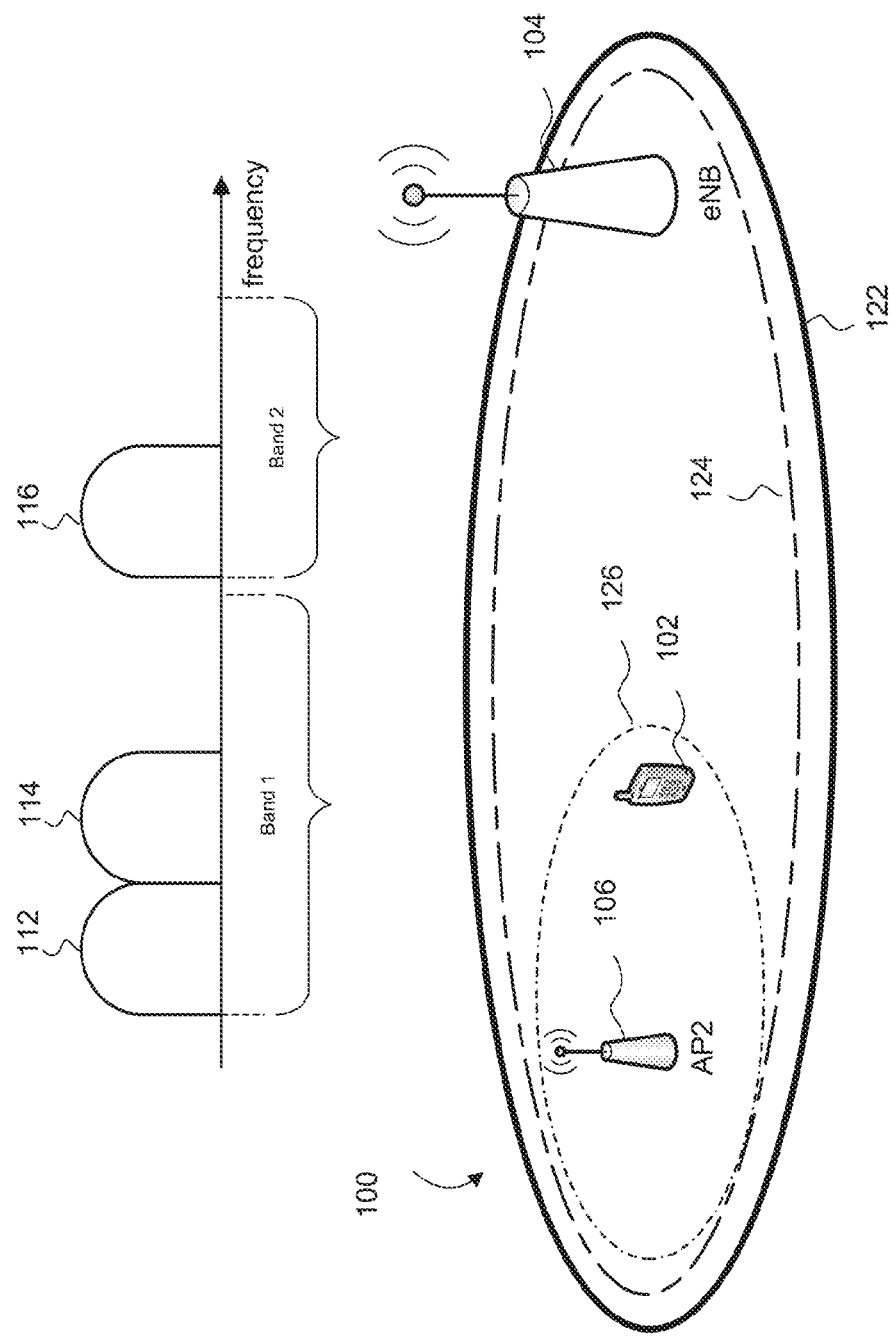
FIG. 1 schematically illustrates carrier aggregation in a heterogeneous network.

FIG. 1 schematically illustrates carrier aggregation in a heterogeneous network 100. The network 100 comprises a UE 102, an eNode B 104 and a second wireless access point 106 (e.g. a picocell base station) having a shorter range than the eNB 104. An aggregated carrier on a downlink connection from the eNB 104 (primary cell) to the UE 102 comprises three component carriers 112, 114, 116. A primary component carrier 112 and a first secondary component carrier 114 are intra-band contiguous carriers associated with serving cells originating at the eNodeB 104. A further secondary component carrier 116 is in a different (higher) frequency band and is associated with the second wireless access point 106. Each of the three component carriers 112, 114, 116 has a respective serving cell 122, 124 and 126. The coverage (i.e. cell size) of the serving cells may differ due, for example, to the different frequency bands experiencing different pathloss characteristics. The primary component carrier 112 is only changed at handover whereas the secondary component carriers such as 114 and 116 can be added (up to a maximum allowed number e.g. five) and removed via the Radio Resource Control network layer once the DL connection has been established and, for example, depending upon prevailing traffic conditions. Media access Controller (MAC) control elements can be used for rapid activation/deactivation of secondary cells after they have been configured by the RRC. The eNodeB 104 can use measurement reporting events to cause release of a particular component carrier as its coverage becomes weak (e.g. below a threshold power). The second wireless access point 106 can trigger release of its carrier in the same way.

The UE 102 is shown to be located simultaneously within all of the three serving cells 112, 114, 116. In this embodiment, each component carrier 112, 114, 116 is shown to have the same bandwidth. However, individual component carriers can typically have a bandwidth selected from: 1.4 MHz, 3 MHz, 5 MHz, 10 MHz, 15 MHz and 20 MHz either in the licensed spectrum or in unlicensed spectrum. In LTE/LTE-A licensed spectrum, these bandwidths are centered on any one of a range of carrier frequencies up to approximately 3.5 GHz. Some carrier frequencies in that range will correspond to unlicensed spectrum, but unlicensed carrier frequencies such as 2.4 GHz or 5 GHz may also be used utilized. These two GHz carrier frequencies can be used for Wi-Fi, so if these are to be used as aggregate carriers, co-existence with Wi-Fi is implemented via, for example, Carrier Sensing and Adaptive Transmission (CSAT) in a time domain. Access to LTE/LTE-A licensed frequencies is non-contentious because it is allocated by the wireless network, but access to unlicensed frequencies will typically be contentious.

Figure 2:
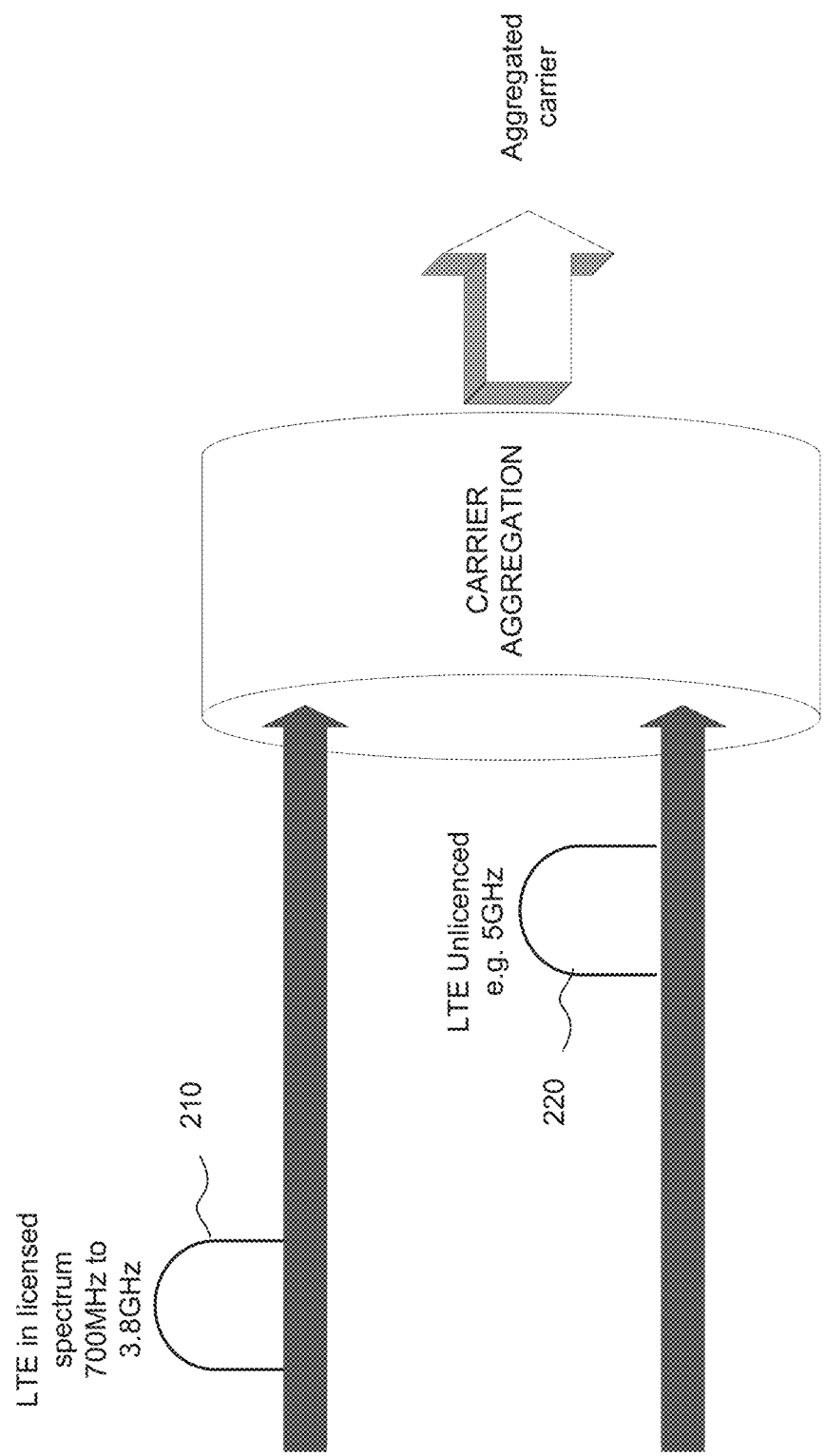
FIG. 2 schematically illustrates the composition of an aggregated carrier.

FIG. 2 schematically illustrates how an aggregated carrier is composed. A first component carrier 210 is a component carrier in the licensed spectrum, for example, within the range 700 MHz to 3 GHz. A second component carrier 220 uses LTE communication protocols on an unlicensed carrier frequency of 5 GHz. Wi-Fi uses a completely communication protocol from LTE on the same 5 GHz carrier frequency. As shown in FIG. 1, the constituent component carriers may be mediated by different wireless access points such as two different eNodeBs, but the UE 102 should be within range of these different access points. The different component carriers are likely to have different Quality of Service constraints, different channel conditions and other differing characteristic properties. Accordingly, the rate of errors detected by the UE upon reception of data may vary considerably for different component carriers. Furthermore, an acceptable tolerance-level of transmission errors may differ between component carriers depending upon the type of data being carried and the service being provided.

The present technique is not limited to aggregating a licensed carrier 210 and an unlicensed carrier 220, but instead recognizes that different component carriers are likely to have at least one difference in inherent characteristics of either the carrier itself or the associated data/service-type being communicated using that carrier. Embodiments allow these different inherent characteristics associated with the component carriers to be taken into account by using a carrier index to identify a hierarchy and/or to discriminate between different categories of carrier and/or carried data so that soft buffering of data (e.g. encoded soft bits used for HARQ processes) for the component carriers is adaptive to these characteristics. In the case of aggregation a licensed and an unlicensed carrier, one inherent technical difference between the two carriers is that the licensed carrier has non-contentious access by the wireless network whereas the unlicensed carrier is typically associated with contentious access.

Figure 3:
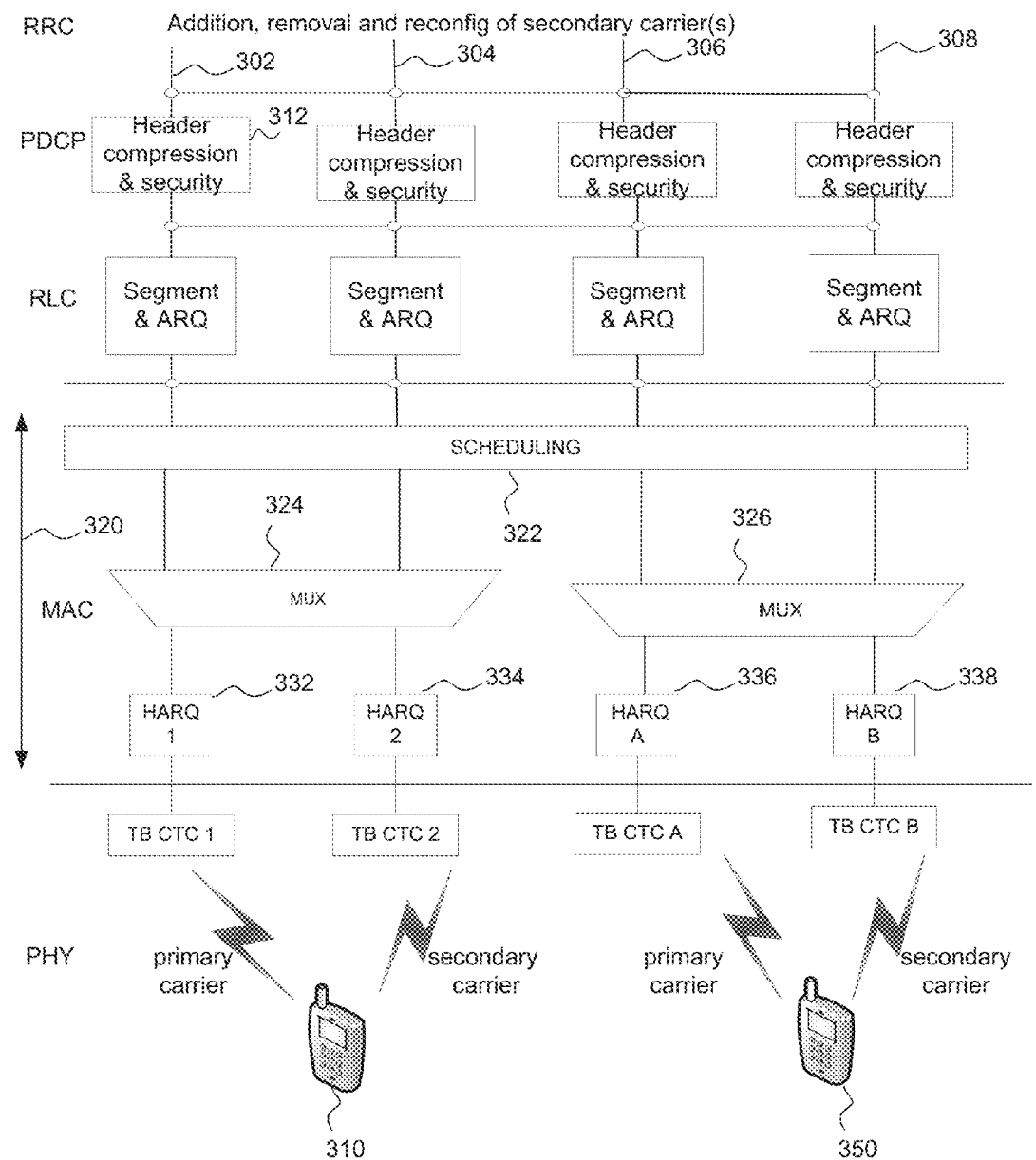
FIG. 3 schematically illustrates downlink flow of data through an LTE protocol stack implementing carrier aggregation.

FIG. 3 schematically illustrates downlink flow of data through an LTE protocol stack where carrier aggregation is implemented. This particular example shows two UEs 310 and 350, each of which is configured to use two component carriers on the DL, i.e. $N^{DU/UL}_{cells}=2$. Thus there are four distinct radio bearers in FIG. 3: two radio bearers 302, 304 corresponding to the component carriers of the UE 310; and two radio bearers 306, 308 corresponding to the component carriers of the UE 350. A Radio Resource Control (RRC) layer performs addition, removal and reconfiguration of the secondary component carriers once the initial connection with the primary component carrier has already been established. Thus the number of configured cells $N_{cells}^{DL/UL}$ may change during the course of a particular wireless communication. For example, if the traffic load reduces then the RRC may reconfigure the secondary component carriers (maintaining the primary carrier) to reduce the total number of component carriers, thereby releasing those radio bearers for use by other wireless connections.

According to the present technique, the RRC is also responsible for assigning to each component carrier, a carrier index value, which indicates a preference ranking (or priority ranking) of each component carrier relative to other component carriers associated with the same UE. This preference ranking may be allocated based upon information inferred from the particular carrier frequency, for example, a 5 GHz carrier frequency is known to relate to a contentious-access carrier whereas a 900 MHz carrier is known to relate to a non-contentious access carrier. Other factors that may be taken into account in calculating a relative ranking of the component carriers include QoS constraints, service type and channel conditions.

The range of carrier index values may simply be integer values up to a maximum value of the maximum number of configurable carriers for the particular UE. The integer values may be assigned such that they ascend as priority increases or alternatively such that they descend as priority increases. One or more threshold values of the carrier index may be set, such that, for example, the total number of five configured carriers is divided into two subsets comprising a high priority carrier subset of three carriers, for which some storage of bits in the soft buffer is guaranteed and a lower-priority subset of two carriers for which soft buffer storage capacity will be available only if that storage is not currently required to store encoded soft bits associated with a failed decoding attempt ready to recombine the soft bits with retransmitted data associated with the high priority component carriers prior to a subsequent decoding attempt. The number of distinct priority categories for component carriers is not limited to two, but can be configured as required.

Based on the categorization of component carriers into a higher preference subset and a lower preference subset, a parameter, $N_C$, is set corresponding to the number of carriers in the higher preference subset of component carriers for which storage of bits in the soft buffer is guaranteed. The parameter $N_C$ is effectively a number of buffer partitions that can be set to be different from the number of currently configured component carriers to prioritize HARQ encoding efficiency of some component carriers relative to other component carriers. The parameters $N_{cells}^{DL/UL}$ and $N_C$ are independent parameters so that the number of component carriers may be reconfigured and yet $N_C$ may remain unchanged as a result of the reconfiguration. Thus it is possible that $N_C > N_{cells}^{DL/UL}$ was based upon a previous configuration comprising a greater number of secondary carriers. However, when the number of secondary component carriers is changed by the RRC it is likely that the carrier index values will be reassigned accordingly to take account of the modified relative priorities of the reconfigured carriers.

Returning to FIG. 3, in the Packet Data Convergent Protocol (PDCP) layer, a header compression and security operations module 310 performs operations on the carrier data for the given configured carrier 302 and this data is then supplied to a segmentation and ARQ module 320 in a Radio Link Control (RLC) layer. This module performs processing tasks such as adding cyclic redundancy checks to the payload data to allow for error detection at the receiving UE 310. Carrier aggregation has no appreciable impact upon the functionality of the PDCP layer and the RLC layer, but these protocol layers should be capable of handling the higher throughputs associated with carrier aggregation, where the number of data flows depending upon the number of radio bearers. In the FIG. 3 example, a total of four radio bearers 302, 304, 306, 308 is being handled.

The MAC layer 320 has its functionality impacted upon by carrier aggregation because the MAC layer at the transmitting side is responsible for distributing data across the configured set of component carriers according to wireless resources allocated by a scheduler 322. At the receiving side, the MAC layer aggregates the data received from the set of component carriers. As shown in FIG. 3, the scheduling of data is performed by the scheduling module 322 and a first multiplexer 324 multiplexes the first component carrier 302 and the second component carrier of the first UE 310. Similarly, a second multiplexer 324, aggregates the two component carriers 306, 308 associated with the second UE 350. Each of the four radio bearers 302, 304, 306, 308 has a respective associated HARQ module 332, 334, 336, 338.

Each HARQ module 332, 334, 336, 338 supports its own set of parallel HARQ processes based upon a Stop and Wait protocol. For example, up to a maximum of eight parallel HARQ processes may be concurrently supported for a given component carrier. In the physical layer (PHY) there will typically be one transport block per component carrier unless spatial multiplexing is used. The PHY layer performs Physical Downlink Control Channel (PDCCH), HARQ ACK/NACK and Channel State Information processes for the plurality of component carriers.

Each of the UEs 310 and 350 has an associated primary carrier and secondary carrier and receives a Transport Block Convolutional Turbo Code (TB CTC) for each component carrier as a result of PHY layer processing as shown in FIG. 3.

Figure 4:
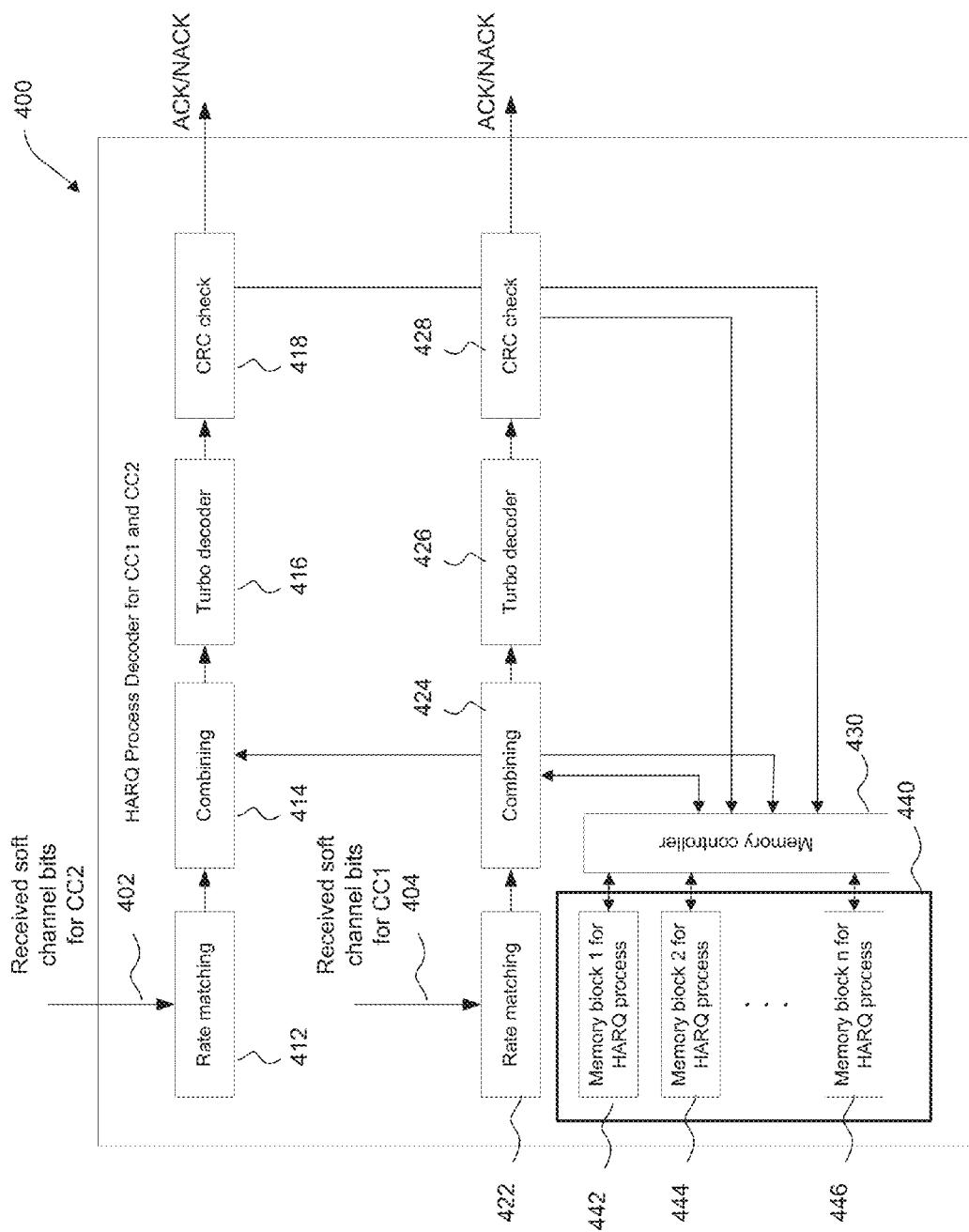
FIG. 4 schematically illustrates an HARQ process decoder implementing a soft buffer according to an embodiment.

FIG. 4 schematically illustrates an HARQ process decoder 400 implementing a soft buffer according to an embodiment in which there are two configured component carriers. The decoder 400 comprises a processing chain for the primary component carrier comprising a rate matching module 412, a combining module 414, a turbo decoder 416 and a Cyclic redundancy code (CRC check module) 418. A parallel processing chain for the secondary component carrier comprises a second rate matching module 422, a second combining module 424, a second turbo decoder 426 and a second Cyclic redundancy code (CRC check module) 428. The HARQ process decoder of FIG. 4 may be used in a UE, an eNodeB or in a Peer Radio Head in a device-to-device communication system. In the UE, the soft channel bits relate to decoding of a DL aggregated carrier whereas in the eNodeB, the soft channel bits relate to the decoding of an UL aggregated carrier.

For each component carrier a sequence of soft channel bits 402, 404 is received as input to the HARQ process decoder 400. Soft channel bits are per-bit Log-Likelihood Ratios (LLRs) derived from each received symbol during a demodulation process. The per-bit LLRs convey the relative likelihoods of each demodulated bit being a logical-0 or logical-1. The sign of the LLR is known to give a "hard decision" for a bit value (0 or 1) and the magnitude of the LLR is known to indicate the reliability of the hard decision. The soft-channel bits may also be de-interleaved at the receiver before being supplied to the rate matching module 412.

Rate matching is a part of the encoding and decoding process in the 3GPP WCDMA/LTE standards. Turbo-codes, like all channel codes, are employed so that messages can be transmitted through a noisy channel as reliably as possible given technology and channel capacity constraints. In general, channel coders map input messages that may be many bits long to codewords that will always be longer than the input message. The ratio of the input message length to the output message length is called the code-rate. In the LTE case and WCDMA Turbo-coded cases, the encoder typically has a rate of 1/3. This means that a 1000 bit message, for example, will be encoded into a 3000-bit codeword (plus some overheads).

If the channel conditions are poor, a rate-1/3 code may be desirable. However, if channel conditions are good then the extra transmitted bits may be wasteful and a higher code-rate of, say, 5/6 may be preferred. In other words, the radio-channel under good conditions may be able to support a higher-rate code.

Rate-Matching is a method where the output of a Turbo-encoder (at the transmitter side) is modified according to the expected conditions of the channel. If the conditions are good, then the rate-matching may be set to ignore, for example, 1500 of the 3000 encoder output bits. This is called "puncturing", and the result is a combined encoder and rate-matching apparatus that has an effective code-rate of 1000/1500.

Alternatively, if the conditions are very poor then the rate-matching can be set to repeat some of the encoder output bits. If 1500 output bits were repeated, then the effective code-rate would be 1000/4500.

The rate-matching unit in a transmitter (not shown), selectively punctures or repeats bits according to the rate-matching parameters provided by the control software. When rate-matching is reversed at the receiver (e.g. by Rate matching module 412 or 422 of FIG. 4), punctured LLRs are replaced with a '0' and repeated LLRs are accumulated so that exactly 3000 LLRs will be presented to the Turbo decoder 416 (a per-bit decoder) for decoding back into 1000 message bits. However, prior to supplying the coded soft bits output by the rate matching module 412 to the turbo decoder 416, some just-received coded soft bit values may be combined by the combining module 414 with previously buffered soft values for the same HARQ process (identified via control data) based on coded soft values stored in a relevant one of a plurality of memory blocks 442, 444, 446 of a soft buffer 440.

The memory blocks for each HARQ process may be implemented as virtual circular buffers and will store some systematic bits and some parity bits of the transport block to which the HARQ process relates. The memory controller 430 is configured to receive control information with regard to transport block size and transport block identification, so that it can identify the different HARQ processes.

HARQ re-transmissions can use either chase combining, in which the PHY layer applies the same puncturing pattern to the original transmission and each retransmission, or incremental redundancy where different puncturing patterns are used for the original transmission and retransmissions of the same data. In the HARQ process decoder 400 of FIG. 4, the combining modules 414, 416 perform combining of an original transmission and one or more retransmissions of a coded transport block for a given HARQ process. The combining may be performed prior to demodulation to improve the signal to noise ratio (assuming signal power is correlated whilst noise power is uncorrelated).

In the soft buffer 440, the total available memory is typically set according to a predetermined UE category, for example as defined in 3GPP TS 36.306 section 4.1 version 12.1.0 dated 4 Jul. 2014, as specified in Table 4.1-1 below.

TABLE 4.1-1

Downlink physical layer parameter values set by the field ue-Category

| UE Category | Maximum number of DL-SCH transport block bits received within a TTI (Note) | Maximum number of bits of a DL-SCH transport block received within a TTI | Total number of soft channel bits | Maximum number of supported layers for spatial multiplexing in DL |
|---|---|---|---|---|
| Category 1 | 10296 | 10296 | 250368 | 1 |
| Category 2 | 51024 | 51024 | 1237248 | 2 |
| Category 3 | 102048 | 75376 | 1237248 | 2 |
| Category 4 | 150752 | 75376 | 1827072 | 2 |
| Category 5 | 299552 | 149776 | 3667200 | 4 |
| Category 6 | 301504 | 149776 (4 layers) 75376 (2 layers) | 3654144 | 2 or 4 |
| Category 7 | 301504 | 149776 (4 layers) 75376 (2 layers) | 3654144 | 2 or 4 |
| Category 8 | 2998560 | 299856 | 35982720 | 8 |
| Category 9 | 452256 | 149776 (4 layers) 75376 (2 layers) | 5481216 | 2 or 4 |
| Category 10 | 452256 | 149776 (4 layers) 75376 (2 layers) | 5481216 | 2 or 4 |

NOTE:
In carrier aggregation operation, the DL-SCH processing capability can be shared by the UE with that of MCH (Multicast Channel) received from a serving cell. If the total eNB scheduling for DL-SCH and an MCH in one serving cell at a given TTI is larger than the defined processing capability, the prioritization between DL-SCH and MCH is left up to UE implementation.

Table 4.1-1 specifies the total number of soft channel bits required for DL HARQ depending upon ten different UE categories. This represents a minimum soft buffer size requirement for a given UE category. The third column of the table gives the maximum number of bits of a downlink Shared Channel (SCH) transport block received within a Transmission Time Interval (TTI). Where the downlink shared channel is the PDSCH, for example, the TTI is one subframe comprising two timeslots and a duration of one millisecond. The total number of soft channel bits listed in table 4.1-1 represents the total number of soft channel bits across all of the HARQ processes for the given DL-SCH. The standards document 3GPP TS 36.213 version 12.2.0 section 7.1.8 specifies the number of soft bits that a UE may store, depending upon the total number of soft channel bits per UE category as given, for example, by the column second from the right in Table 4.1-1 and depending upon the number of configured cells (i.e. component carriers). In previously known systems the total available soft buffer capacity was equally partitioned across the total number of configured carriers of an aggregated carrier. However, according to embodiments, in the denominator of the equation for nSB in section 7.1.8 of 3GPP TS 36.213 version 12.2.0, the number of configured cells ($N^{DL/UL}_{cells}$) is replaced by the value $\min(N^{DL/UL}_{cells}, N_C)$, where $N_C$ is a new parameter depending upon component carrier prioritization as determined, for example, from the carrier index values of the component carrier. $N_C$ represents the number of component carriers for which storage of at least some soft bits in the soft buffer is guaranteed rather than available only opportunistically, depending on a current soft buffer occupancy level. Although the total available soft buffer capacity across all HARQ processes may be specified by Table 4.1-1 reproduced above, in alternative embodiments the total available soft buffer capacity could be set so as to be capable of supporting HARQ decoding for a subset of the total number of configured component carriers.

In FIG. 4, the memory controller 430 controls storage and retrieval of data to/from the soft buffer memory blocks 442, 444,446 depending upon a buffer allocation policy and a buffer replacement policy. In one embodiment, the buffer allocation policy partitions the buffer into $N_C$ partitions and provides privileged access to soft buffer memory to a subset of $N_C$ component carriers such that any component carriers not in the privileged subset are allocated storage in the soft buffer only when that memory it is not currently required (occupied) by an HARQ process corresponding to one of the privileged component carriers. The buffer replacement policy uses the carrier index value as part of a replacement policy such that when the soft buffer (or one of its carrier-mapped partitions is full), incoming soft bits for which soft buffer storage is requested are stored in the soft buffer only if the bit index for the incoming soft bit indicates that it is a higher priority bit for that component carrier than currently stored bits having the same carrier index.

After being processed by the inverse rate matching module 412 and the combining module 414, the LLR values for the coded data are supplied to the turbo decoder 416 where the transport block data is decoded by obtaining hard decisions for the systematic bits of the TB CTC. The decoded transport block is supplied to a CRC check module 418, which checks whether or not the transport block has been correctly received and decoded. Output of the CRC check is fed back to the memory controller 430, so that in the event of an unsuccessful decoding (failed CRC check) soft bits associated with that HARQ process may be stored in the soft buffer for combining with future retransmissions. The outcome of the CRC check 418 on the decoded transport block also determines whether an ACK or a NACK is sent to the transmitter (eNodeB) on the Physical Uplink Control Channel (PUCCH). For simplicity, no partitioning is shown in the soft-buffer of FIG. 4, but there is a memory block 442, 444, 446 for each of a plurality of HARQ processes for each of the two configured component channels CC1 and CC2. The soft buffer is shared between the two different component carriers CC1 and CC2 of the aggregated carrier.

Figure 5:
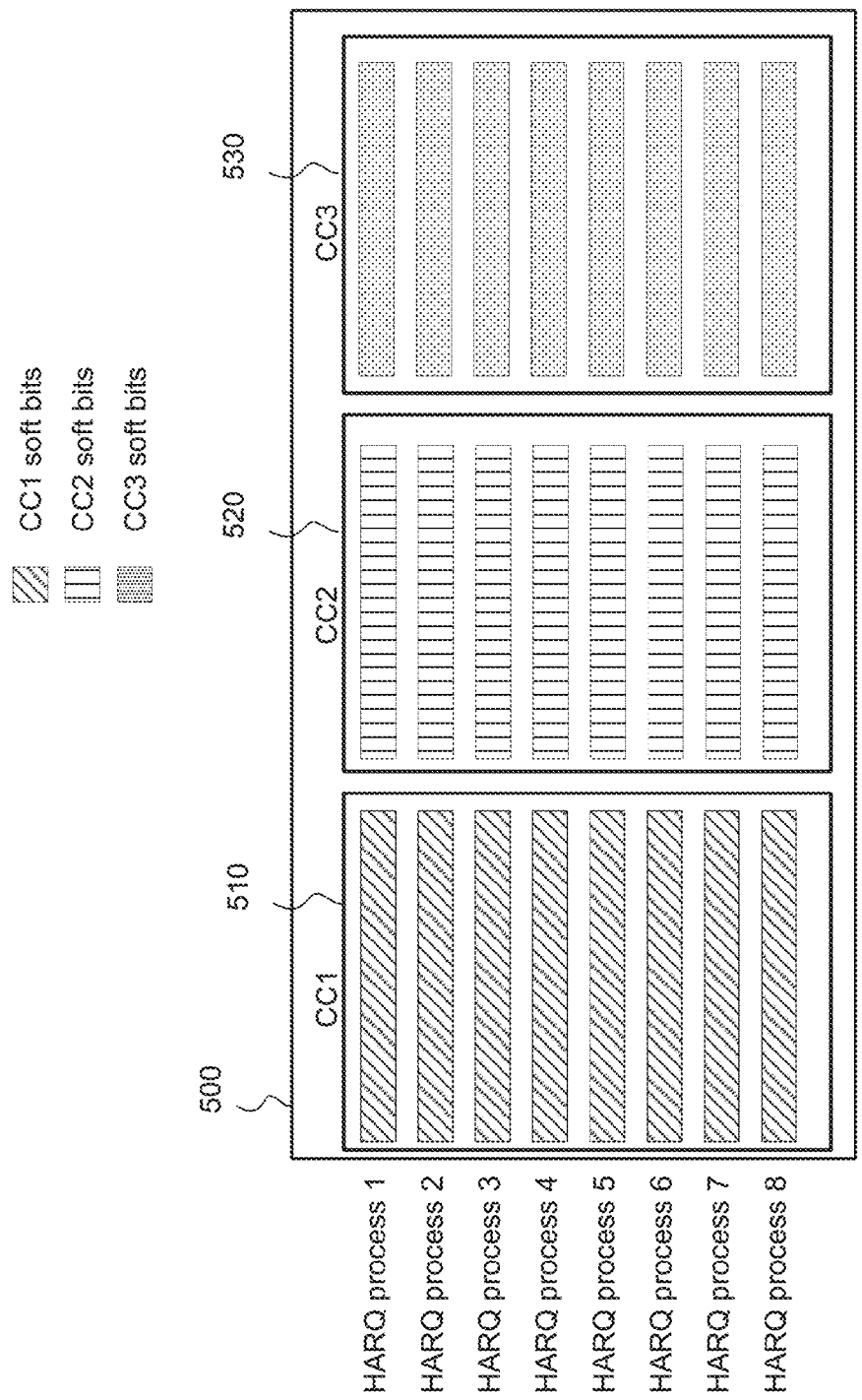
FIG. 5 schematically illustrates equal partitioning of a soft buffer across all configured component carriers.

FIG. 5 schematically illustrates soft buffer partitioning as conventionally performed, with the buffer being partitioned such that each configured component carrier is allocated an equal storage capacity.

It should be noted that a large number of the aggregated component carriers (for example, more than 5 component carriers) implies additional memory requirements at the UE to store received soft channel bits for HARQ operation. More specifically in 3GPP TS 36.213 version 12.2.0 dated 3 Jul. 2014, the procedure for storing soft channel bits is described in case of decoding failure, where the UE has to equally split the available memory of size $N'_{soft}$ between $N^{DL/UL}_{cells}$ configured component carriers to store the received bits.

7.1.8 Storing soft channel bits based on equal partitioning across all configured carrier/cells Both for FDD and TDD, if the UE is configured with more than one serving cell, then for each serving cell, for at least $K_{MIMO} \cdot min(M_{DL\_HARQ}, M_{limit})$ transport blocks, upon decoding failure of a code block of a transport block, the UE shall store received soft channel bits corresponding to a range of at least $w_k$ $w_{k+1}, \ldots, w_{mod(k+n_{SB}-1,N_{cb})}$, where:

$$n_{SB} = min\left(N_{cb}, \left\lfloor \frac{N'_{soft}}{C \cdot N^{DL}_{cells} \cdot K_{MIMO} \cdot min(M_{DL\_HARQ}, M_{limit})} \right\rfloor\right), \quad \text{Equation 1A}$$

$w_k$, C, $N_{cb}$, $K_{MIMO}$, and $M_{limit}$ are defined in clause 5.1.4.1.2 of 3GPP TS 36.212 version 12.2.0 of 3 Jul. 2014. The parameter $w_k$ represents bits in a virtual circular buffer following interleaving of three bitstreams and collection of the bits as illustrated in FIG. 5.1.4-2 of 3GPP TS 36.212 version 12.2.0.

$M_{DL\_HARQ}$ is the maximum number of DL HARQ processes.

$N^{DL}_{cells}$ is the number of configured serving cells.

If the UE signals ue-Category-v1020, $N'_{soft}$ is the total number of soft channel bits [3GPP TS 36.306 version 12.1.0 of 4 Jul. 2014] according to the UE category indicated by ue-Category-v1020 [11]. Otherwise, $N'_{soft}$ is the total number of soft channel bits [12] according to the UE category indicated by ue-Category[11].

The soft buffer partitioning implemented in accordance with equation 1A is shown in FIG. 5 for the case of $N^{DL/UL}_{cells}=3$. The soft buffer 500 is divided into three memory partitions corresponding to the three component carriers, with each partition comprising eight memory blocks corresponding respectively to eight HARQ processes. Soft bits corresponding to a first component carrier are stored in a first soft buffer partition 510. Soft bits corresponding to a second component carrier are stored in a second partition 520. Soft bits corresponding to a third component carrier are stored in a third partition 530. As illustrated in FIG. 5, the three buffer partitions corresponding respectively to the three component carriers CC1, CC2, CC3 all have equal capacity such that the total available soft buffer capacity is equally divided amongst the total number of configured component carriers. No account is taken of inherent characteristics of the component carriers or the data/service type associated with the particular component carrier.

It should be noted that the memory for storing soft channel bits is typically one of the most expensive parts of the UE. In this case it is not always desirable to scale the memory size for storing soft channel bits with the number of component carrier that can be aggregated at the UE receiver. As explained above, the total soft buffer capacity across all HARQ processes may be preconfigured according to Table 4.1-1, regardless of the number of configured component carriers. In this case, the amount of the available memory may not be sufficient to store the all soft channel bits of the all received code-block. Therefore, soft channel bits discarding procedure at the UE (or soft buffer management) is defined in 3GPP TS 36.213 version 12.2.0 of 3 Jul. 2014, where priority for storing is given for the received bits with lower bit index 'k' in the rate matching pattern of size $N_{cb}$.

7.1.8 Storing soft channel bits

. . .

In determining k, the UE should give priority to storing soft channel bits corresponding to lower values of k. $w_k$ shall correspond to a received soft channel bit. The range $w_k$ $w_{k+1}, \ldots, w_{mod(k+n_{SB}-1,N_{cb})}$ may include subsets not containing received soft channel bits.

It should be noted that the requirements for efficient HARQ operation on the component carriers with, for example, licensed and licensed-assisted access could be different. More specifically, the licensed component carriers shall maintain the Quality of Service (QoS), while licensed-assisted access component carrier QoS support would not be required, due to opportunistic use of the available spectrum.

In other words, licensed-assisted carrier aggregation would be used to deliver critical information and guaranteed QoS, and unlicensed spectrum, to opportunistically boost the data transmission rate. In this case, the current LTE approach of equal partitioning of the soft channel bits memory across all configured component carriers is not efficient to support carriers of different types, for example, carriers with licensed and carriers with licensed-assisted access. Therefore, some enhancements to the existing mechanism of soft buffer management are needed.

According to the present technique, UE behavior with respect to management of the soft buffer 440 for storing soft channel bits may be enhanced. More specifically, the soft channel memory 440 may be split across a smaller number of the configured component carriers $N_C \leq N^{DL/UL}_{cells}$ (e.g. corresponding to the number of carriers operating on the licensed spectrum) and a specify new priority rule of storing the received soft channel bits in accordance with the carrier index. In this case, the eNB would have more flexibility to optimize HARQ operation on the component carriers corresponding to the licensed spectrum (with QoS) or some other component carrier characteristic and provide opportunistic use of the available memory for HARQ on other component carriers, e.g. corresponding to carriers with licensed-assisted access. In other words, the proposed approach guarantees memory for storing the received soft channel bits for at least $N_C$ carriers upon decoding failure, while for the remaining $(N^{DL/UL}_{cells} - N_C)$ carriers the access to the memory would be provided upon the memory availability. The fallback operation to conventional soft buffer management behavior can be provided by configuring $N_C = N^{DL/UL}_{cells}$ for the UE.

Comparing to the existing LTE-A specification (prior to 23 Sep. 2014), the proposed approach facilitates more flexible control of HARQ operation across carriers with licensed and licensed-assisted access or with other differing carrier characteristics. It also allows UE implementations with reduced cost due to less stringent memory requirements to store soft channel bits for the carriers with licensed assisted access (or other lower priority carriers of the full set of configured component carriers).

According to embodiments, UE behavior with respect to management of the soft buffer for storing soft channel bits may be enhanced. More specifically, it is proposed to allow splitting the soft channel memory across a smaller number of the configured component carriers $N_C \leq N^{DL/UL}_{cells}$ (e.g. corresponding to the number of carriers operating on the licensed spectrum). In this case, the eNB would have more flexibility to optimize HARQ operation on the component carriers corresponding to the licensed spectrum (with QoS) by splitting the available memory across those carriers (guaranteeing soft buffer access for at least a portion of the soft bits for those carriers that are allocated a memory portion) and providing opportunistic use of the available memory for HARQ on other component carriers corresponding to, for example carriers with licensed-assisted access.

Figure 6:
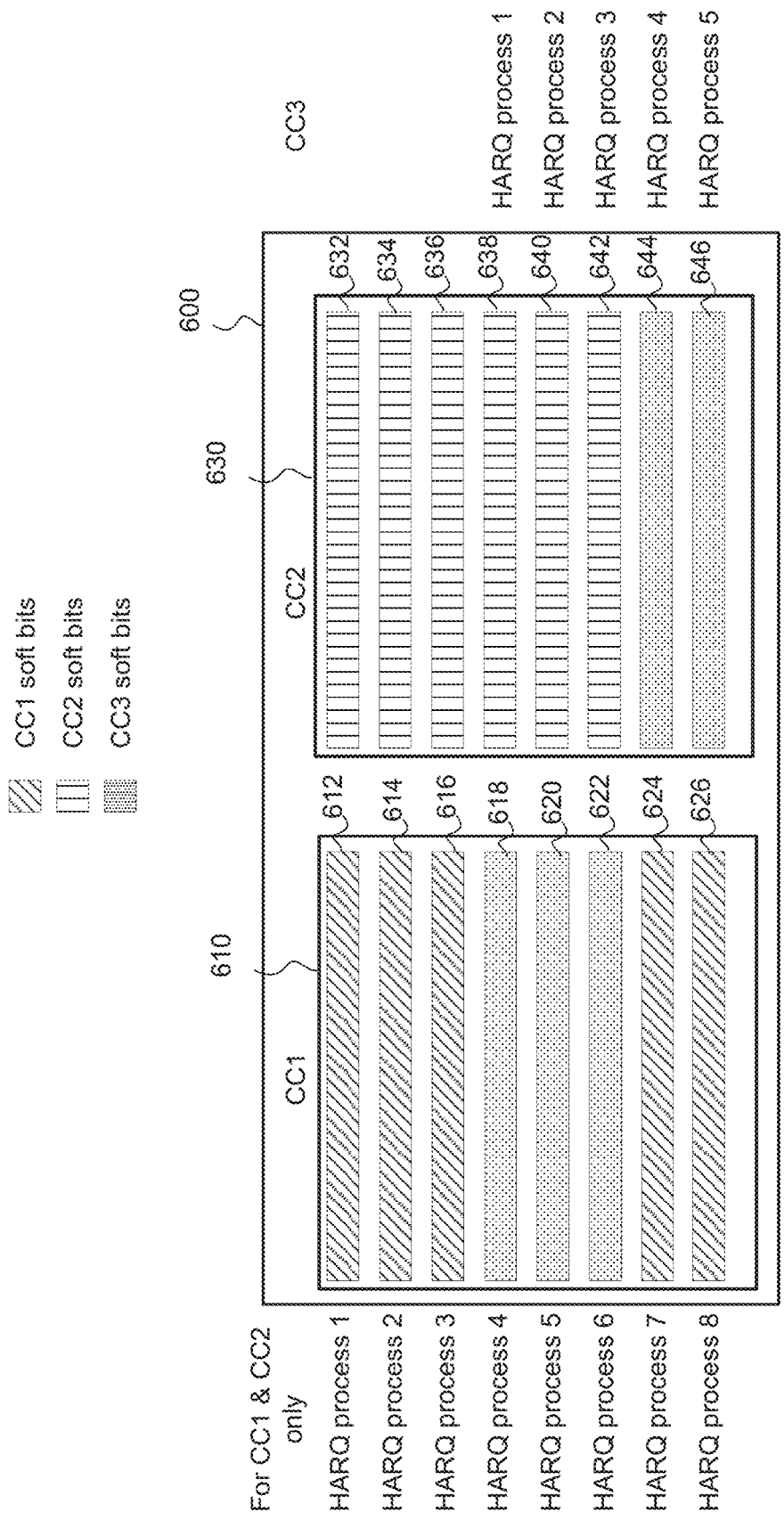
FIG. 6 schematically illustrates partitioning of a soft buffer to prioritize a subset of the configured component carriers according to an embodiment.

FIG. 6 schematically illustrates the example of soft buffer partitioning for storing soft channel bits across $N^{DL/UL}_{cells}=3$ configured component carriers, where the first two component carriers (CC1 and CC2) may correspond to the carriers with licensed access and the third component carrier (CC3) may correspond to the carrier with licensed-assisted access. Alternative embodiments could associate CC1 and CC2 with higher priority component carriers based on channel characteristics, conditions and/or QoS requirements and associate CC3 as a lower priority component carrier on a basis other than identifying whether or not it is an unlicensed carrier.

In one embodiment, the memory is split across the two ($N_C=2$) component carriers and soft buffer access for the received coded bits from the third component carrier in the event of a decoding failure and pending receipt of retransmitted data is provided in opportunistic manner upon availability of the soft buffer memory. As shown in FIG. 6, the soft buffer memory 600 has the same total capacity as the soft buffer memory 500 of the FIG. 5 arrangement, but the same total memory capacity is now allocated such that it is divided between two partitions 610 and 630 rather than three. Each partition has eight blocks corresponding to eight independent HARQ processes. The first partition 610, which is mapped to CC1, has eight memory blocks 612, 614, 616, 618, 620, 622, 624 and 626. The second partition 630, which is mapped to CC2, has eight memory blocks 632, 634, 636, 638, 640, 642, 644, 646. As shown in FIG. 6, only some of the memory blocks of the first partition 610 are currently required for soft bit storage or HARQ processes associated with CC1. In particular memory blocks 618, 620 and 622 corresponding respectively to HARQ processes 4, 5 and 6 on CC1 are not currently occupied by soft bits of CC1. This may occur, for example, when these memory blocks have been recently released due to successful retransmissions of erroneously decoded data. Instead blocks 618, 620 and 622 they have been opportunistically allocated for storing received soft channel bits of incorrectly received transmissions with HARQ processes 1, 2 and 3 of the lower priority component carrier CC3. Similarly, the last two memory blocks 644, 646 of the second partition 630, are not currently required by HARQ processes 7 and 8 of CC2, so they have been opportunistically allocated to store received channel bits of incorrectly received transmissions with HARQ process 4 and process 5 of the lower priority component carrier CC3. The number of partitions and the number of HARQ process blocks shown in FIG. 6 are examples only and may be different in alternative embodiments. In the example embodiment of FIG. 6, $N_C=2$ and $N^{DL/UL}_{cells}=3$.

The proposed soft buffer memory splitting procedure can be defined by adapting the equations in 3GPP the TS 36.213 version 12.2.0 as follows, where the new parameter $N_C$ can be either semi-statically configured to the UE or hard coded in the specification.

7.1.8 Storing soft channel bits taking account of new parameter $N_C$ enabling prioritisation of a subset of component carriers selected from the configured component carriers depending upon a carrier index value.

Both for FDD and TDD, if the UE is configured with more than one serving cell for at least $\min(N^{DL}_{cells}, N_C)$ serving cells (rather than for each serving cell as specified by the existing standard prior to 23 Sep. 2014), for at least $K_{MIMO} \cdot \min(M_{DL\_HARQ}, M_{limit})$ transport blocks, upon decoding failure of a code block of a transport block, the UE shall store received soft channel bits corresponding to a range of at least $w_k^c\ w_{k+1}^c, \ldots, w_{mod(k+n_{SB}-1, N_{cb})}^c$, where:

$$n_{SB} = \min\left(N_{cb}, \left\lfloor \frac{N'_{soft}}{C \cdot \min(N^{DL}_{cells}, N_C) \cdot K_{MIMO} \cdot \min(M_{DL\_HARQ}, M_{limit})} \right\rfloor\right) \quad \text{Equation 1B}$$

$w_k^c$, C, $N_{cb}$, $K_{MIMO}$, and $M_{limit}$ are defined in clause 5.1.4.1.2 of [3GPP TS 36.212 version 12.1.0, dated 3 Jul. 2014].

MDL_HARQ is the maximum number of DL HARQ processes.

$N^{DL/UL}_{cells}$ is the number of configured serving cells on the UL or on the DL.

Note that in the equation for nS in the technique for storing soft channel bits of equation 1A, the available soft buffer memory is equally partitioned across all configured carriers such that the factor $N^{DL/UL}_{cells}$ appears in the denominator. By way of contrast, according to equation 1 B, this factor is replaced by $\min(N^{DL/UL}_{cells}, N_C)$. This allows for selection of a subset of configured carriers $N_C < N^{DL/UL}_{cells}$ for which allocation of soft buffer memory is prioritized such that access to buffer storage is guaranteed for at least some higher priority bits of those prioritized carriers. For non-prioritized carriers the soft-buffer access is merely opportunistic. This allows for more efficient use of limited soft buffer capacity, for example, by providing preferential soft-buffer storage for component carriers associated with a service having stricter QoS constraints.

If the UE signals ue-Category-v1020, $N'_{soft}$ is the total number of soft channel bits [3GPP TS.36.306 version 12.1.0] according to the UE category indicated by ue-Category-v1020 [3GPP TS.36.306 version 12.1.0] and $N_{limit}$ is constant. Otherwise, $N'_{soft}$ is the total number of soft channel bits [3GPP TS.36.306 version 12.1.0] according to the UE category indicated by ue-Category [3GPP TS.36.306 version 12.1.0] and $N_{limit}$ is the constant.

Since the amount of the available memory may not be sufficient to store all received soft channel bits across all component carriers, the discarding rule can be also enhanced relative to 3GPP TS 36.213 version 12.2.0. In particular, according to the present technique, carrier index 'c' of the received bits is included in prioritization rules, e.g. as follows, where the priority for storing is given for bits received from the carrier with lower index.

In determining c, the UE should give priority to storing soft channel bits corresponding to lower values of c. For a given c in determining k, the UE should give priority to storing soft channel bits corresponding to lower values of k, which is the bit index for the given bit in the rate matching buffer). $w_k^c$ shall correspond to a received soft channel bit. The range $w_k^c$ $w_{k+1}^c$, . . . , $w_{mod(k+n_{SB}-1, N_{cb})}^c$ may include subsets not containing received soft channel bits.

In other embodiments the higher priority may have bits from the carriers with higher carrier index.

Figure 7:
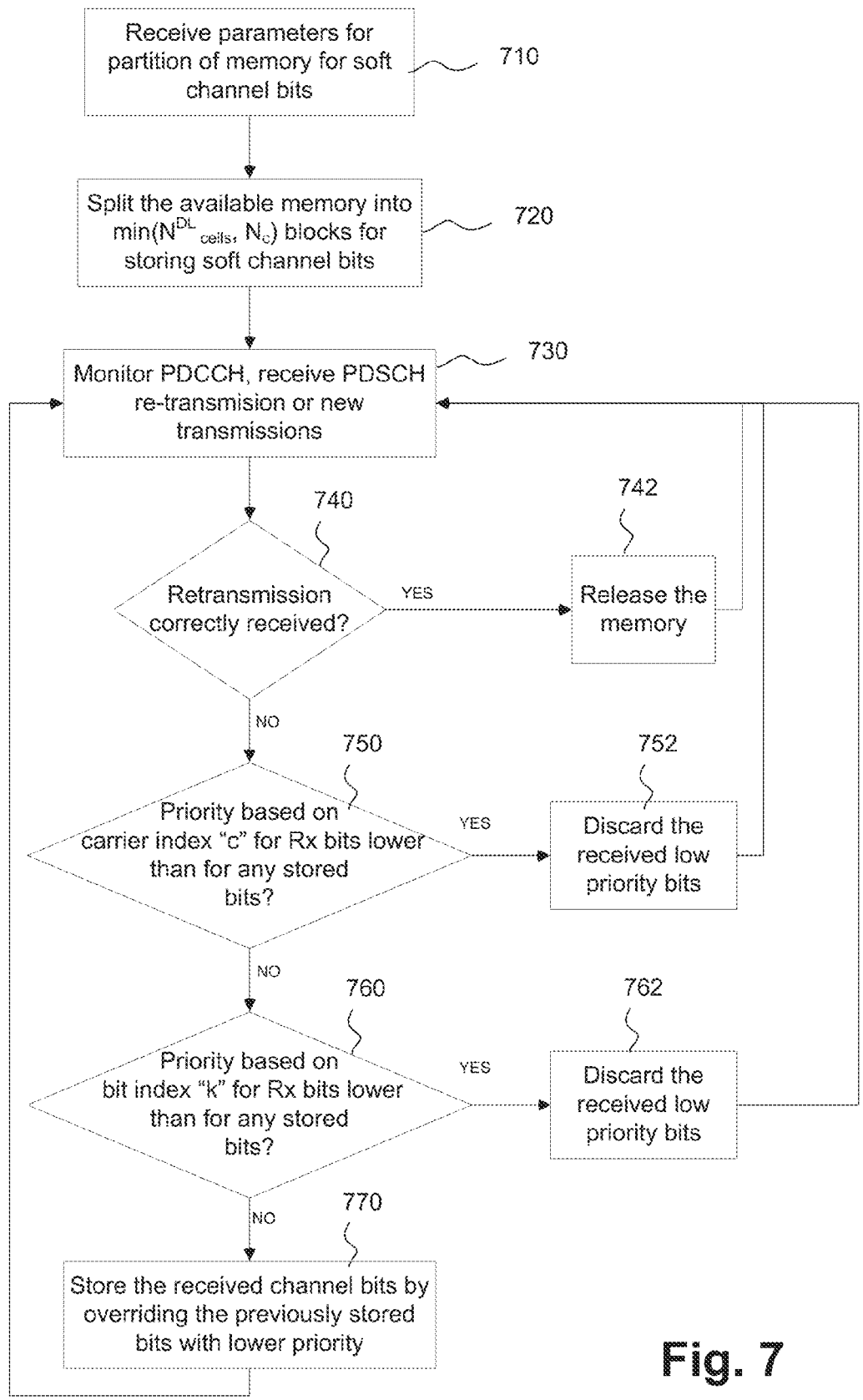
FIG. 7 is a flow chart schematically illustrating splitting the buffer memory and storing of soft bits in accordance with a carrier index.

The flow chart of the proposed procedure of splitting memory and storing soft channel bits in accordance with the carrier index, 'c' is shown in FIG. 7.

At process element 710 the memory controller 430 of the HARQ process decoder 400 (see FIG. 4) receives a set of parameters for partitioning the soft buffer memory. These parameters may include the total number of soft buffer bits per TTI from table 4.1-1 above, the number of configured carriers $N_{cells}^{DL/UL}$ and the number of prioritized carriers $N_C$. $N_C$ may be preconfigured by hard coding in, for example, a future version of the standards document 3GPP 36.213, or alternatively may be semi-statically configured at the UE, for example, via RRC signaling.

At process element 720, the total available soft buffer memory defined by, for example, Table 4.1-1 is split between the configured cells (or equivalently component carriers) by splitting the memory into $\min(N^{DL/UL}_{cells}, N_C)$ distinct blocks or partitions. Although we are primarily considering carrier aggregation on the DL in FIG. 7, the present technique could alternatively be applied to carrier aggregation on the UL. The parameters $N^{DL/UL}_{cells}$ and $N_C$ may be independent parameters and typically the number of prioritized component carriers will be less than the maximum number of configured carriers e.g. $N^{DL/UL}_{cells}$. However, if $N_C = N^{DL/UL}_{cells}$, this should result in equally splitting the buffer across all configured cells. Otherwise the soft buffer may be split equally across the prioritized subset of component carriers, but unequally overall with regard to the full set of configured component carriers. In yet further alternative arrangements, $N_C$ may be changed by the RRC in response to reconfigurations of the number of configured carriers once the DL connection has been established and before it is turn down.

At process element 730, the PDCCH/enhanced PDCCH (EPDCCH) is monitored and any incoming retransmitted transport blocks relevant to an HARQ process where the transport block has previously been received but unsuccessfully decoded (based on result of CRC check) by the receiver are identified. The retransmitted coded transport blocks are combined with one or more previously transmitted versions retrieved from the soft buffer prior to turbo decoding.

At process element 740, if the output of the turbo decoder passes the CRC check then the soft buffer memory reserved for the HARQ process for that transport block is released at process element 742 and the process returns to monitoring the PDCCH/EPDCCH for a new transmissions or re-transmissions at process element 730. However, if the turbo decoder output fails the CRC check, then the most recently received coded transport block may be stored in the soft buffer for combining with a further retransmission of the transport block.

At process element 750, bits of the most recently received transport block associated with a failed CRC check are evaluated to determine whether they are of sufficiently high priority to permit storage of those bits in the HARQ soft buffer. First of all, the incoming coded soft bits are filtered according to the carrier index 'c', which provides a priority or preference ranking relative to other currently configured component carriers. If the priority based on the carrier index for the received soft bits is lower than for any of the bits currently stored in the HARQ buffer, then all of the soft bits of the incoming transport block are discarded at process element 752 and the process returns to process element 730.

However if at process element 750, the priority derived from the carrier index 'c' is greater than or equal to the carrier index of at least some currently stored soft bits, the rate matching bit index 'k' of individual bits in the transport block of the particular component carrier is used to make a decision on whether that bit qualifies for soft buffering. For example, at process element 750, the incoming bits could relate to the same component carrier for which some soft bits are currently stored in one of the soft buffer partitions. The bit index 'k' is as defined for $w_k$ in section 5.1.4.1 of 3GPP TS 36.212 version 12.1.0. The bit index 'k' provides an index to a bit position in a virtual circular buffer after three bit streams have been interleaved. The parity bits should have lower priority than the systematic bits for storage in the soft buffer.

If the priority of the incoming received bit is lower than the priority of any currently stored bits and there is no free space in the soft buffer, then the low priority bits are discarded at process element 762 and the process returns to the monitoring process element 730.

However, if the priority of the incoming received bits based on the bit index 'k' is greater than the corresponding bit index for previously stored bits corresponding to the same component channel then the incoming bits replace the lower priority bits currently stored in the soft buffer. The process then returns to monitoring of the PDCCH for retransmissions at process element 730.

Overall, the flow chart of FIG. 7 illustrates how the new carrier index 'c' and the existing rate matching bit-index 'k' are used together to prioritize storage of certain soft bits in the soft buffer depending upon certain carrier characteristics. Although the flow chart of FIG. 7 relates to a DL aggregated carriers and PDSCH transmission, alternative embodiments relate to an UL PUSCH transmission using multiple UL aggregated carriers.

Figure 8:
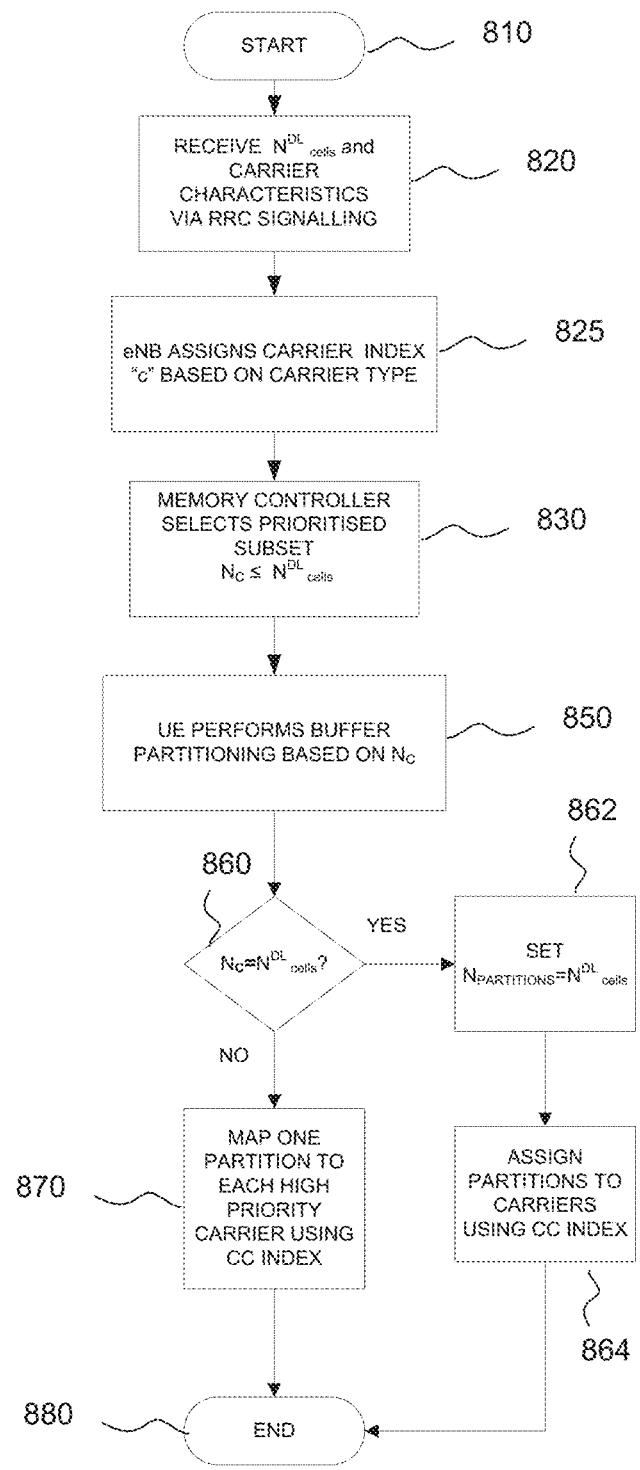
FIG. 8 is a flow chart schematically illustrating buffer partitioning according to an embodiment.

FIG. 8 is a flow chart schematically illustrating prioritization of soft buffer storage such that a subset of configured component carriers takes priority with respect to other configured component carriers. The process starts at 810 and then at process element 820, the eNodeB 104 (see FIG. 1) establishes from the RRC protocol layer a number of currently configured component channels $N_{cells}^{DL}$ on the PDSCH for a given aggregated carrier. Based upon one or more component carrier characteristics obtained wither via RRC signaling or otherwise, the eNodeB 104 assigns a carrier index to each of the component carriers at process element 825. The carrier index provides a priority ranking of the component carrier relative to other currently configured component carriers of the aggregated carrier. The carrier index may be, for example, an ascending or descending integer value providing a progressively increasing or decreasing priority ranking. In an alternative example, all licensed spectrum carriers (non-contentiously accessed carriers) may have an index value of 1 whereas all unlicensed spectrum carriers (contentiously accessed carriers) may have an index value of zero or vice versa such that different categories of carrier are allocated respective different index values. The carrier index value may be allocated based upon at least one of: component carrier frequency, component carrier bandwidth; channel conditions on the component carrier; QoS constraints associated with the component carrier; and whether the access-type of the component carrier is contentious or non-contentious. Any one or more of these component carrier characteristics may be used to identify higher priority subsets and lower priority subsets of the full set of currently configured component carriers.

At process element 830 the memory controller 430 of the soft buffer (see FIG. 4) receives the carrier index values and the number of currently configured component carriers for the aggregate carrier via RRC signaling and uses one or more of these values to assign a relative ranking to the configured carriers by associating a carrier index value with each currently configured carrier. The carrier index value may be assigned by the RRC protocol layer and communicated to the memory controller. Alternatively, the carrier index value may be assigned to the component carriers at the UE by the memory controller based upon control information from the eNode B. The RRC protocol layer is implemented both in the UE and in the eNodeB and its functions include establishment, maintenance and teardown of point to point radio bearers.

At process element 830 of FIG. 8, the memory controller 430 determines the value of the parameter $N_C$, which gives a number of soft buffer partitions to enable prioritization of some carriers and may correspond also to a number of component carriers for which soft buffer access is to be prioritized. The parameter $N_C$ can be set such that it differs from $N_{cells}^{DL}$. Furthermore $N_{cells}^{DL}$ and $N_C$ may be set independently. The memory controller 430 then implements a buffer partitioning rule, to set the number of soft buffer partitions equal to $N_C$. In this non-limiting example $N_c \geq N_{cells}^{DL}$.

At process element 850, the buffer is partitioned into $N_C$ partitions. This involves dividing the total available soft buffer capacity for the relevant UE category (see table 4.1-1 across $\min(N_{cells}^{DL/UL}, N_C)$ component carriers, rather than across the total number $N_{cells}^{DL}$ of currently configured component carriers. Typically $N_C$ will be less than $N_{cells}^{DL/UL}$ because this allows a subset of the configured carriers to be prioritized by preferentially allocating soft buffer storage to carriers of that subset.

At process element 860, it is determined whether or not $Nc = N_{cells}^{DL/UL}$ and, if so, the process proceeds to element 862, where the number of buffer partitions is set to be equal to the number of configured carriers. However, if at process element 860 it is determined that $Nc < N_{cells}^{DL/UL}$ then the total available soft buffer capacity is equally divided amongst the $N_C$ buffer partitions, and a subset of higher priority component carriers is mapped in a one-to-one mapping to the set of buffer partitions. The mapping may be performed based upon a priority ordering derived from the carrier index values assigned to the component carriers. The process ends at 880. Although not shown in FIG. 8, if $Nc > N_{cells}^{DL/UL}$, then the buffer is partitioned such that it is divided equally amongst the configured component carriers.

Figure 9:
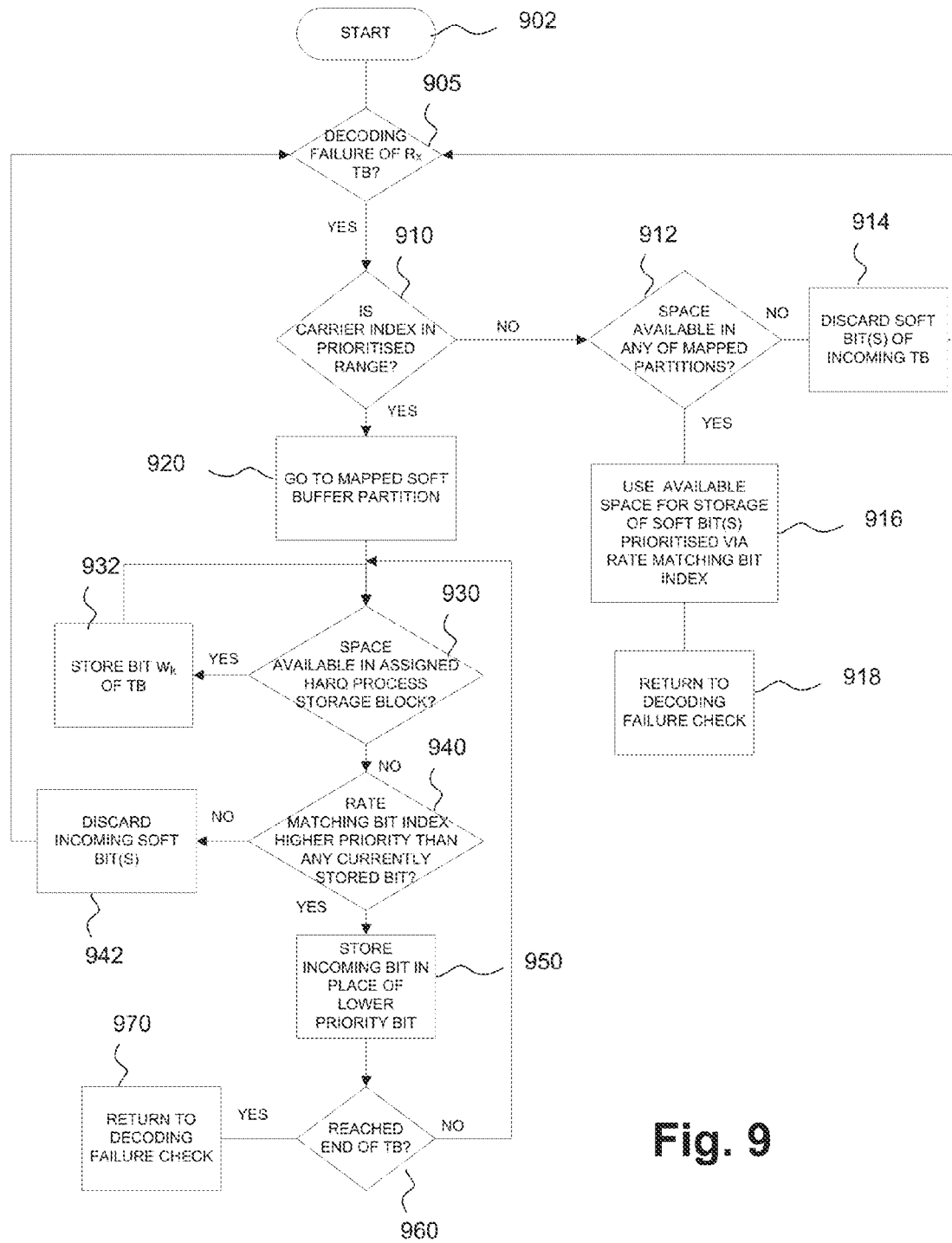
FIG. 9 is a flow chart schematically illustrating in more detail storage of soft bits and eviction of soft bits from the soft buffer based on both the carrier index and a rate matching bit index.

FIG. 9 is a flow chart schematically illustrating in more detail, allocation of soft buffer memory according to an embodiment. The process starts at 902, then at process element 905 the memory controller 430 (see FIG. 4) monitors for the occurrence of a decoding failure (failed CRC check) for a transport block. In the event of a failed decoding the soft bits of the coded transport block are flagged for storage in an HARQ process block of the HARQ soft buffer 440.

At process element 910, control information associated with the transport block is used to identify an associated carrier index value 'c' (corresponding to the component carrier) and a rate matching bit index, k, for each bit of the coded transport block. There will be a range of carrier index values corresponding to prioritized component carriers. The number of carrier index values corresponding to prioritized component carriers is equal to $N_C$ in this embodiment. Consider a case where
$N_{cells}^{DL/UL}=5$ and $N_C=3$ and the carrier index values are c=1, 2, 3, 4, 5. The soft buffer partitions are mapped to component carriers c=1, 2, 3. The remaining component carriers c=4 & 5 are permitted access to buffer storage only if that space is not currently fully utilized by c=1, 2 & 3.

If at process element 910 the carrier index c=4 or 5, the process proceeds to stage 912 to determine if there is space currently available in any of the soft buffer partitions corresponding to the prioritized carriers. If there is no available unused space in the soft buffer then the process proceeds to process element 914 where the incoming soft bit(s) of the coded transport block are discarded and the process returns to process element 905. However, if space is in fact found to be available at process element 912, then the process proceeds to process element 916, where any available space in the soft buffer is utilized for storage of the soft bit(s) of the transport block of the lower priority component carrier. If there is not capacity to store all bits of the coded transport block, then storage of the bits is prioritized via the rate matching bit index 'k', such that lower values of k are given higher priority (giving precedence to systematic bits over parity bits). The process then proceeds to the decoding failure check of process element 905.

Returning now to process element 910, if it is found during the check of the carrier index that it is in a range indicating that the associated component carrier is to receive prioritized storage in the soft buffer, then the process proceeds to process element 920, where the particular soft buffer partition that has been mapped to the prioritized component carrier is identified. Next, the process proceeds to process element 930, where it is determined whether there is space for the bits of the incoming coded transport block in one of the HARQ process storage blocks within the mapped memory partition. If there is still free space remaining in the mapped memory portion then the bits of the transport block are stored there at process element 932. However, if all of the HARQ process storage blocks in the allocated partition are fully occupied then the process proceeds to process element 940, where a decision on whether or not to evict stored bits from the buffer partition to make space for the incoming data is made based upon the rate matching bit index, 'k'. The parameter 'k' is the rate matching bit index of the given bit within the rate matching pattern of size Ncb, where the soft buffer size for the transport block is denoted by NIR bits and the soft buffer size for the r-th code block by Ncb bits. The size Ncb is obtained as follows (for DL-SCH and PCH), where C is the number of code blocks computed in section 5.1.2 of 3GPP TS 36.212 version 12.1.0:

$$N_{cb} = \min\left(\left\lfloor \frac{N_{IR}}{C} \right\rfloor, K_w\right)$$

Kw is as defined in section 5.1.4.1.2 of 3GPP TS 36.212 version 12.1.0. In this embodiment, lower values of k are given higher priority for storage than higher values of k. Thus, if the rate matching index of the incoming bits indicates that those bits are lower priority than currently stored bits then those bits are discarded at process element 942 and the process proceeds to the decoding failure check at process element 905. However, if instead at process element 940 the rate matching bit index indicates than an incoming bit is higher priority than a currently stored bit associated with the same carrier index then the lowest priority bit currently stored in the relevant buffer partition is evicted and replaced by the incoming higher priority bit at process element 950. If there are further bits to store then the process returns to process element 930 where the availability of storage is assessed. However, if all bits of the incoming coded transport block have already been stored then the process returns to stage 905, where a decoding failure of a subsequent incoming transport block is awaited.

Figure 10:
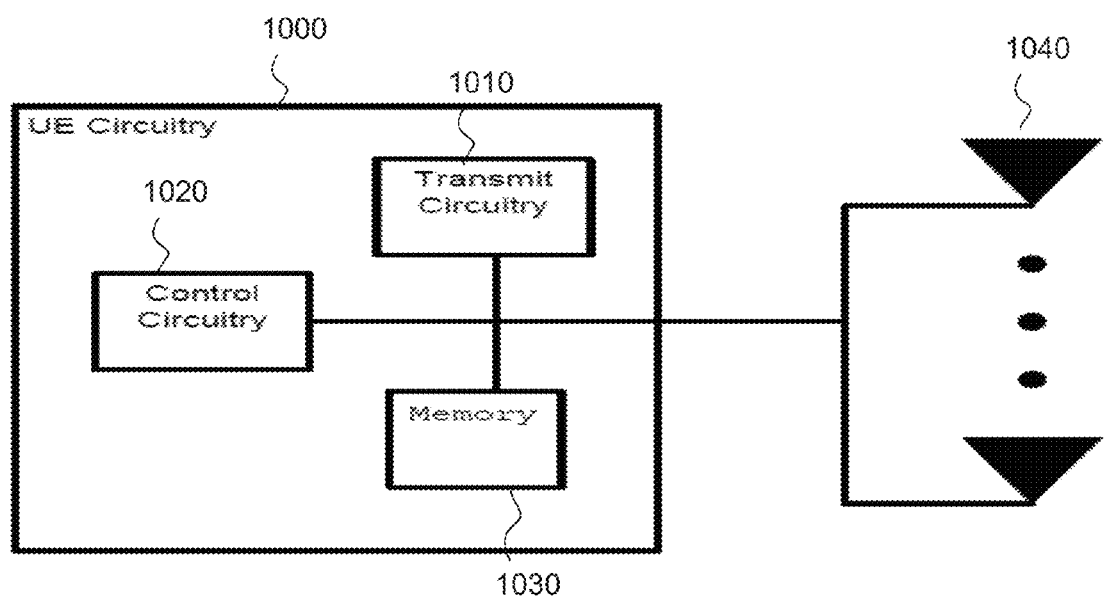
FIG. 10 schematically illustrates UE circuitry according to embodiments.

FIG. 10 illustrates circuitry 1000 that may be UE circuitry, in accordance with various embodiments. In embodiments, the UE circuitry may include radio transmitter circuitry 1010 and receiver circuitry coupled to control circuitry 1020. The UE circuitry may be coupled with one or more plurality of antenna elements 1040 of one or more antennas. The UE circuitry and/or the components of the UE circuitry may be configured to perform operations similar to those described elsewhere in this disclosure.

Specifically, the UE circuitry 1000 may be configured to use carrier aggregation with at least two downlink component carriers. The receive circuitry may be coupled with the memory, and configured to receive a soft channel bit of a physical downlink shared channel (PDSCH). The control circuitry 1020 may be coupled with the receive circuitry and/or the memory 1030, and configured to identify, based on a number of downlink component carriers on which the UE may receive a signal, a size of a carrier based memory partition of the memory 1030. The control circuitry 1020 may be further configured to store, if a decoding failure related to the received soft channel bit occurs, the received soft channel bit in the carrier based memory partition of the memory based on a priority parameter of the soft channel bit.

As used herein, the term "circuitry" may refer to, be part of, or include an Application Specific Integrated Circuit (ASIC), an electronic circuit, a processor (shared, dedicated, or group), and/or memory (shared, dedicated, or group) that execute one or more software or firmware programs, a combinational logic circuit, and/or other suitable hardware components that provide the described functionality. In some embodiments, the electronic device circuitry may be implemented in, or functions associated with the circuitry may be implemented by, one or more software or firmware modules.

Figure 11:
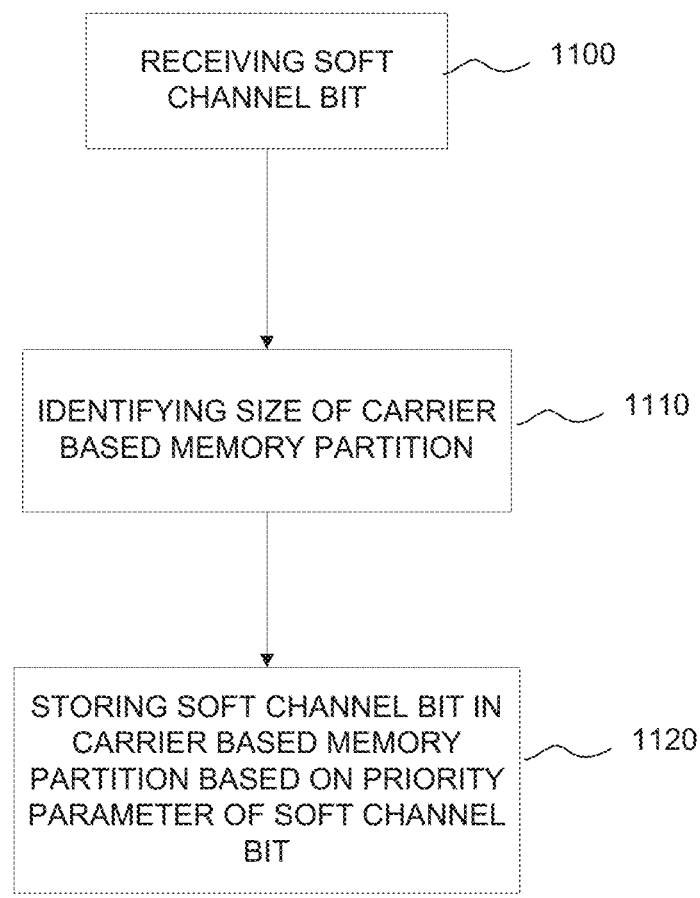
FIG. 11 schematically illustrates a soft bit storage process implemented by the UE of FIG. 10.

In some embodiments the UE circuitry of FIG. 10 may be configured to perform one or more processes such as the process of FIG. 11. The process may include receiving at process element 1100, by a user equipment (UE) configured to use carrier aggregation with at least two downlink component carriers, a soft channel bit. The process may further include at process element 1110 identifying, by the UE based on a number of downlink component carriers on which the UE may receive a signal, a size of a carrier based memory partition. The process may further include at process element 1120 storing, by the UE if a decoding failure related to the received soft channel bit occurs, the received soft channel bit in the carrier based memory partition based on a priority parameter of the soft channel bit.

Figure 12:
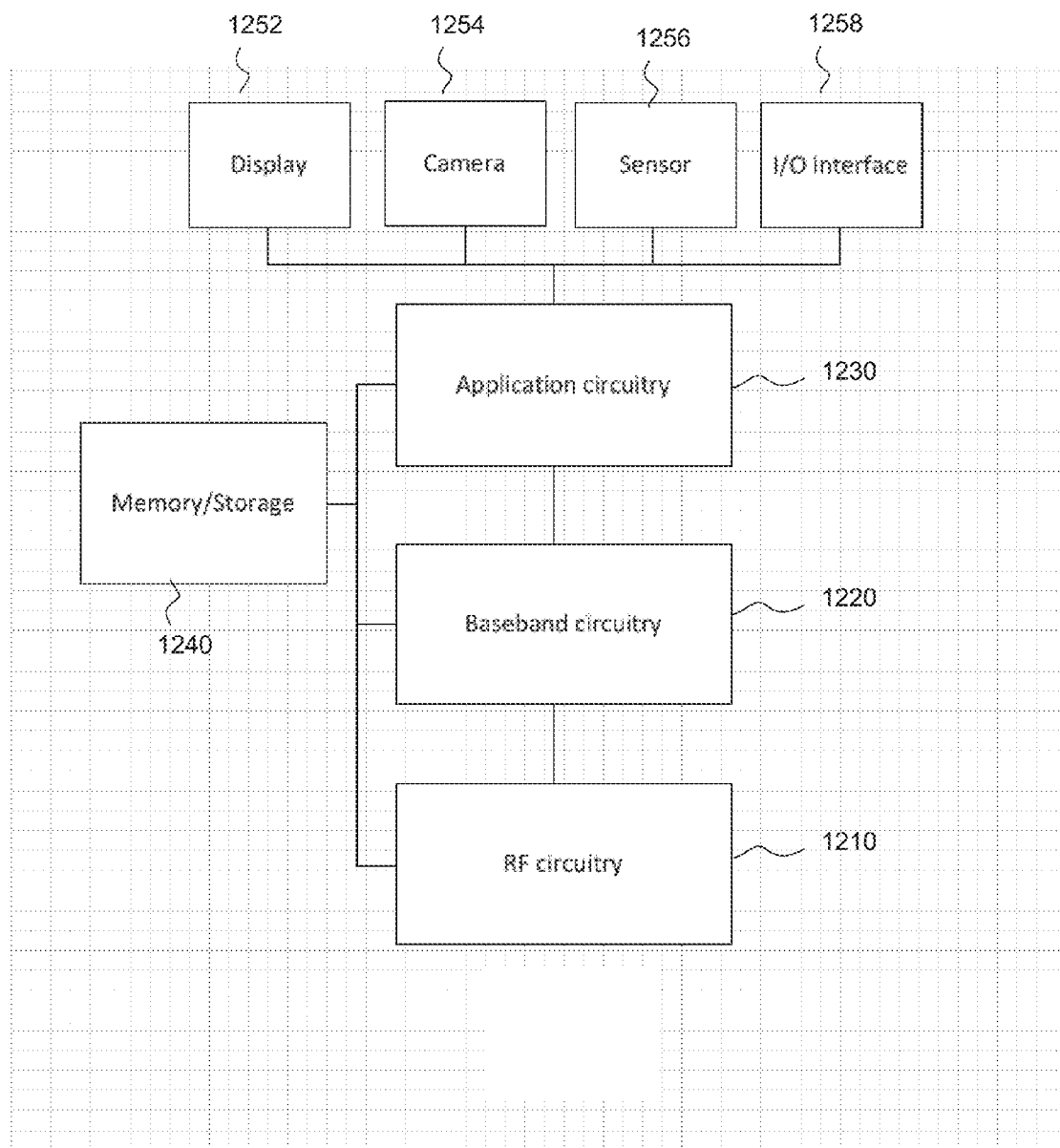
FIG. 12 schematically illustrates a hardware/software system according to embodiments.

Embodiments described herein may be implemented into a system using any suitably configured hardware and/or software. FIG. 12 illustrates, for one embodiment, an example system comprising radio frequency (RF) circuitry 1210, baseband circuitry 1220, application circuitry 1230, memory/storage 1240, display 1252, camera 1254, sensor 1256, and input/output (I/O) interface 1258, coupled with each other at least as shown.

The application circuitry 1230 may include circuitry such as, but not limited to, one or more single-core or multi-core processors. The processor(s) may include any combination of general-purpose processors and dedicated processors (e.g., graphics processors, application processors, etc.). The processors may be coupled with memory/storage 1240 and configured to execute instructions stored in the memory/storage 1240 to enable various applications and/or operating systems running on the system.

The baseband circuitry 1220 may include circuitry such as, but not limited to, one or more single-core or multi-core processors. The processor(s) may include a baseband processor. The baseband circuitry may handle various radio control functions that enables communication with one or more radio networks via the RF circuitry 1210. The radio control functions may include, but are not limited to, signal modulation, encoding, decoding, radio frequency shifting, etc. In some embodiments, the baseband circuitry 1220 may provide for communication compatible with one or more radio technologies. For example, in some embodiments, the baseband circuitry 1220 may support communication with an evolved universal terrestrial radio access network (EU-TRAN) and/or other wireless metropolitan area networks (WMAN), a wireless local area network (WLAN), a wireless personal area network (WPAN). Embodiments in which the baseband circuitry 1220 is configured to support radio communications of more than one wireless protocol may be referred to as multi-mode baseband circuitry.

In various embodiments, baseband circuitry 1220 may include circuitry to operate with signals that are not strictly considered as being in a baseband frequency. For example, in some embodiments, baseband circuitry 1220 may include circuitry to operate with signals having an intermediate frequency, which is between a baseband frequency and a radio frequency.

RF circuitry 1210 may enable communication with wireless networks using modulated electromagnetic radiation through a non-solid medium. In various embodiments, the RF circuitry 1210 may include switches, filters, amplifiers, etc. to facilitate the communication with the wireless network.

In various embodiments, RF circuitry 1210 may include circuitry to operate with signals that are not strictly considered as being in a radio frequency. For example, in some embodiments, RF circuitry 1210 may include circuitry to operate with signals having an intermediate frequency, which is between a baseband frequency and a radio frequency.

In various embodiments, the transmitter circuitry, control circuitry, or receiver circuitry discussed above with respect to the UE may be embodied in whole or in part one or more of the RF circuitry, the baseband circuitry 1220, and/or the application circuitry 1230. As used herein, the term "circuitry" may refer to, be part of, or include an Application Specific Integrated Circuit (ASIC), an electronic circuit, a processor (shared, dedicated, or group), and/or memory (shared, dedicated, or group) that execute one or more software or firmware programs, a combinational logic circuit, and/or other suitable hardware components that provide the described functionality. In some embodiments, the electronic device circuitry may be implemented in, or functions associated with the circuitry may be implemented by, one or more software or firmware modules.

In some embodiments, some or all of the constituent components of the baseband circuitry 1220, the application circuitry 1230, and/or the memory/storage 1240 may be implemented together on a system on a chip (SOC).

Memory/storage 1240 may be used to load and store data and/or instructions, for example, for system. Memory/storage 1240 for one embodiment may include any combination of suitable volatile memory (e.g., dynamic random access memory (DRAM)) and/or non-volatile memory (e.g., Flash memory).

In various embodiments, the I/O interface 1258 may include one or more user interfaces designed to enable user interaction with the system and/or peripheral component interfaces designed to enable peripheral component interaction with the system. User interfaces may include, but are not limited to a physical keyboard or keypad, a touchpad, a speaker, a microphone, etc. Peripheral component interfaces may include, but are not limited to, a non-volatile memory port, a universal serial bus (USB) port, an audio jack, and a power supply interface.

In various embodiments sensor 1256 may include one or more sensing devices to determine environmental conditions and/or location information related to the system. In some embodiments, the sensors may include, but are not limited to, a gyro sensor, an accelerometer, a proximity sensor, an ambient light sensor, and a positioning unit. The positioning unit may also be part of, or interact with, the baseband circuitry and/or RF circuitry to communicate with components of a positioning network, e.g., a global positioning system (GPS) satellite.

In various embodiments, the display 1252 may include a display (e.g., a liquid crystal display, a touch screen display, etc.).

In various embodiments, the system may be a mobile computing device such as, but not limited to, a laptop computing device, a tablet computing device, a netbook, an ultrabook, a smartphone, etc. In various embodiments, system may have more or less components, and/or different architectures.

It should be understood that the functional units described in this specification have been labeled as modules, to highlight their implementation independence. Note that a module may be implemented, for example, as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions, which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network. The modules may be passive or active, including agents operable to perform desired functions.

Where functional units have been described as circuitry, the circuitry may be general purpose processor circuitry configured by program code to perform specified processing functions. The circuitry may also be configured by modification to the processing hardware. Configuration of the circuitry to perform a specified function may be entirely in hardware, entirely in software or using a combination of hardware modification and software execution. Program instructions may be used to configure logic gates of general purpose or special-purpose processor circuitry to perform a processing function. Program instructions may be provided on a non-transitory medium or via a transitory medium.

The foregoing description of one or more implementations provides illustration and description, but is not intended to be exhaustive or to limit the scope of the invention to the precise form disclosed. Modifications and variations are possible in light of the above teachings or may be acquired from practice of various implementations of the invention.

Some Examples are provided below.

Example 1 may include a method for wireless communications using carrier aggregation with at least two component carriers, the method comprising: determination of the memory size at the user equipment for storing the received soft channel bits of the physical downlink shared channel (PDSCH) in accordance to the number of configured downlink component carriers and the parameter defining the maximum number of such carrier-based memory partitions; storing the received PDSCH channel bits upon decoding failure in the soft buffer of the determined memory size in accordance to the bit index within the rate matching buffer and the carrier index of the received PDSCH channel bits.

Example 2 may include the method of Example 1, wherein the memory is equally split across minimum of number of configured downlink component carriers and parameter defining the maximum number of such carrier based memory partitions.

Example may include the method of Example 2, wherein the parameter defining the maximum number of carrier based memory partitions is higher layer configured to the user equipment or defined in the specification.

Example 4 may include the method of Example 2, wherein the parameter defining the maximum number of carrier based memory partitions is defined in the specification.

Example 5 may include the method of Example 1, wherein the received PDSCH channel bits is stored in the memory if the carrier index of the received PDSCH channel bits is lower (higher) than carrier index of any previously stored PDSCH channel bits.

Example 6 may include the method of Example 5, wherein the received PDSCH channel bits is stored in the memory if the bit index within the rate matching buffer of the received PDSCH channel bits is lower than bit index within the rate matching buffer of any previously stored PDSCH channel bits of the same carrier index.

Example 7 may include a user equipment (UE) configured with at least two component carriers, wherein UE comprising: baseband and radio-frequency receiver; memory for storing the received channel bits; processor for determination of the memory size for storing the received soft channel bits of the physical downlink shared channel (PDSCH) in accordance to the number of configured downlink component carriers and the parameter defining the maximum number of such carrier-based memory partitions; and processor for storing the received PDSCH channel bits upon decoding failure in the soft buffer of the determined memory size in accordance to the bit index within the rate matching buffer and the carrier index of the received PDSCH channel bits.

Example 8 may include the UE of Example 7, wherein the memory is equally divided by processor in accordance to the number of configured downlink component carriers, but not more than the specific number defined by the parameter.

Example 9 may include the UE of Example 8, wherein the parameter is higher layer configured to the UE by the network.

Example 10 may include the UE of Example 8, wherein the parameter is defined in the specification.

Example 11 may include the UE of Example 7, wherein the processor stores the received PDSCH channel bits in the memory if the carrier index of the received PDSCH channel bits is lower (higher) than carrier index of any previously stored PDSCH channel bits.

Example 12 may include the UE of Example 7, wherein the processor stores the received PDSCH channel bits is stored in the memory if the bit index within the rate matching buffer of the received PDSCH channel bits is lower than bit index within the rate matching buffer of any previously stored PDSCH channel bits of the same carrier index.

Example 13 may include a method of communicating in a wireless network as shown and described herein.

Example 14 may include a system for providing wireless communication as shown and described herein.

Example 15 may include a device for providing wireless communication as shown and described herein.

Example 16 may include a method comprising: receiving, by a user equipment (UE) configured to use carrier aggregation with at least two downlink component carriers, a soft channel bit; identifying, by the UE based on a number of downlink component carriers on which the UE may receive a signal, a size of a carrier based memory partition; and storing, by the UE if a decoding failure related to the received soft channel bit occurs, the received soft channel bit in the carrier based memory partition based on a priority parameter of the soft channel bit.

Example 17 may include the method of Example 16, wherein the soft channel bit is a soft channel bit of a physical downlink shared channel (PDSCH).

Example 18 may include the method of Example 16, wherein the size of the carrier based memory partition is further based on a pre-defined maximum number of carrier-based memory partitions.

Example 19 may include the method of any of Examples 16-18, wherein the priority parameter is related to a bit index within a rate matching buffer.

Example 20 may include the method of Example 19, further comprising storing, by the UE if a decoding failure related to the received soft channel bit occurs, the received soft channel bit in the carrier based memory partition based on a comparison of the bit index of the received soft channel bit with a bit index of a soft channel bit that is previously stored in the carrier based memory partition.

Example 21 may include the method of any of Examples 16-18, wherein the priority parameter is related to a carrier index of the received soft channel bit.

Example 22 may include the method of Example 21, further comprising storing, by the UE if a decoding failure related to the received soft channel bit occurs, the received soft channel bit in the carrier based memory partition based on a comparison of the carrier index of the received soft channel bit with a carrier index of a soft channel bit that is previously stored in the carrier based memory partition.

Example 23 may include the method of any of Examples 16-18, wherein the size of the carrier based memory partition is based on a minimum of a number of configured downlink component carriers related to the UE and a maximum number of carrier based memory partitions.

Example 24 may include the method of Example 23, wherein the maximum number of carrier based memory partitions is pre-defined in the UE or based on an indication received by the UE in higher layer signaling.

Example 25 may include a user equipment (UE) configured to use carrier aggregation with at least two downlink component carriers, the UE comprising: a memory; receive circuitry coupled with the memory, the receive circuitry to receive a soft channel bit of a physical downlink shared channel (PDSCH); and control circuitry coupled with the receive circuitry, the control circuitry to: identify, based on a number of downlink component carriers on which the UE may receive a signal, a size of a carrier based memory partition of the memory; and store, if a decoding failure related to the received soft channel bit occurs, the received soft channel bit in the carrier based memory partition of the memory based on a priority parameter of the soft channel bit.

Example 26 may include the UE of Example 25, wherein the size of the carrier based memory partition is further based on a pre-defined maximum number of carrier-based memory partitions of the memory.

Example 27 may include the UE of Examples 25 or 26, wherein the priority parameter is related to a bit index within a rate matching buffer.

Example 28 may include the UE of Example 27, wherein the control circuitry is further to store the received soft channel bit in the carrier based memory partition of the memory based on a comparison of the bit index of the received soft channel bit with a bit index of a soft channel bit that is previously stored in the carrier based memory partition of the memory.

Example 29 may include the UE of Examples 25 or 26, wherein the priority parameter is related to a carrier index of the received soft channel bit.

Example 30 may include the UE of Example 29, wherein the control circuitry is further to store, if a decoding failure related to the received soft channel bit occurs, the received soft channel bit in the carrier based memory partition of the memory based on a comparison of the carrier index of the received soft channel bit with a carrier index of a soft channel bit that is previously stored in the carrier based memory partition of the memory.

Example 31 may include the UE of Examples 25 or 26, wherein the size of the carrier based memory partition of the memory is based on a minimum of a number of configured downlink component carriers related to the UE and a maximum number of carrier based memory partitions.

Example 32 may include the UE of Example 31, wherein the maximum number of carrier based memory partitions of the memory is pre-defined in the memory or based on an indication received by the receive circuitry in higher layer signaling.

Example 33 may include a user equipment (UE) comprising means to perform the method of any of Examples 1-6, 13, or 16-24.

Example 34 may include one or more non-transitory computer-readable media comprising instructions to cause a user equipment (UE), upon execution of the instructions by one or more processors of the UE, to perform the method of any of Examples 1-6, 13, or 16-24.

Some embodiments are as described in the following numbered clauses.

Soft buffer management circuitry for use in a device of a wireless communication system, the circuitry comprising:

input circuitry configured to receive from transceiver circuitry in the device, prioritisation information corresponding to an aggregated carrier comprising a plurality, $N^{DL/UL}_{cells}$, of configured component carriers;

control circuitry configured to control storage in a soft buffer of soft channel bits for a decoding process corresponding to two or more of the plurality of configured component carriers by prioritising allocation of storage locations in the soft buffer depending upon a carrier index value corresponding to a respective component carrier, the carrier index value depending upon the prioritisation information.

2. The soft buffer management circuitry of clause 1, wherein the control circuitry is configured to use the carrier index value to distinguish between at least two different prioritisation categories of component carrier.

3. The soft buffer management circuitry of clause 1 or clause 2, wherein the control circuitry is configured to allocate at least one configured component carrier guaranteed access to storage locations in the soft buffer and to allocate at least one configured component carrier opportunistic access to storage locations in the soft buffer, wherein allocation of guaranteed access or opportunistic access depends upon the different prioritisation categories of the component carriers.

4. The soft buffer management circuitry of any one of clauses 1 to 3, wherein the control circuitry is configured to divide the soft buffer into a plurality, min($N_C$, $N^{DL/UL}_{cells}$), of buffer partitions, where $N_C$ is a buffer partition parameter allowing the number of soft buffer partitions to be set to a number different from the number of configured component carriers $N^{DL/UL}_{cells}$ of the aggregated carrier.

5. The soft buffer management circuitry of clause 4, wherein the buffer partition parameter NC specifies a number of prioritised component carriers of the aggregated carrier for which storage in the soft buffer of at least some soft bits corresponding to the respective component carrier is to be guaranteed whereas non-prioritised component carriers of the aggregated carrier are allocated storage in the soft buffer only when not currently required by one or more of the prioritised component carriers.

6. The soft buffer management circuitry of any one of clauses 1 to 5, wherein the carrier index values for the plurality of configured component carriers are assigned as a progressive sequence of integer values providing a priority ranking amongst the plurality of configured component carriers with respect to allocation of soft buffer storage.

7. The soft buffer management circuitry of any one of clauses 1 to 6, wherein at least one of the carrier index value and the number NC of prioritised component carriers is configured via Radio Resource Control signalling.

8. The soft buffer management circuitry of any one of clauses 4 to 7, wherein $N_C < N^{DL/UL}_{cells}$ and wherein a prioritised subset of component carriers is mapped to the $N_C$ buffer partitions providing guaranteed access for that subset of component carriers and wherein a remaining subset of ($N^{DL/UL}_{cells} - N_C$) component carriers is provided with opportunistic access to storage in the memory partitions mapped to the prioritised subset of component carriers.

9. The soft buffer management circuitry of clause 8, wherein the prioritised subset of $N_C$ component carriers is selected based upon carrier index values for the plurality of configured component carriers.

10. The soft buffer management circuitry of clause 8 or clause 9, wherein the prioritised subset of component carriers corresponds to carriers having non-contentious access and the remaining subset of carriers corresponds to carriers having contentious access.

11. The soft buffer management circuitry of any one of clauses 4 to 10, wherein a total capacity of the soft buffer is to be sufficient to support HARQ processes for a number of prioritised component carriers equal to the number $N_C$ of prioritised component carriers, wherein NC is less than the number of currently configured component carriers, $N^{DL/UL}_{cells}$.

12. The soft buffer management circuitry of any one of clauses 1 to 11, wherein the control circuitry is configured to prioritise allocation of storage locations of the soft buffer for a particular carrier index depending upon a rate matching index of the soft bits of the corresponding component carrier and wherein the rate matching index indicates a bit index in a rate matching buffer for the corresponding component channel.

13. The soft buffer management circuitry of any one of clauses 1 to 12, wherein the control circuitry is configured to implement a soft-bit replacement policy in the soft buffer such that an incoming soft bit replaces a currently-stored soft bit depending upon relative values of the carrier indices for an incoming soft bit and a currently-stored soft bit.

14. The soft buffer management circuitry of any one of clauses 1 to 13, wherein the soft-bit replacement policy for soft bits corresponding to a given carrier index value depends upon a comparison of relative values of a rate matching index within a rate matching buffer corresponding to the incoming soft bit and the currently-stored soft bit.

15. The soft buffer management circuitry of an one of clauses 1 to 14, wherein the aggregated carrier corresponds to one of the PDSCH and the PUSCH.

16. The soft buffer management circuitry of any one of clauses 1 to 15, wherein the soft bits correspond to an HARQ process for the corresponding component carrier.

17. A UE comprising the soft buffer management circuitry of clause 1 and the soft buffer.

18. The UE of clause 17, wherein the control circuitry is configured to partition an available soft buffer memory capacity into a number of buffer partitions equal to min (Nc, $N^{DL/UL}_{cells}$), where Nc is a number of soft buffer partitions set to allow prioritization of soft buffer storage for a subset of the plurality of configured component carriers.

19. The UE as claimed in clause 18, wherein the number NC of soft buffer partitions is either preconfigured for the UE or is signalled to the UE from a higher network layer.

20. The UE as claimed in any one of clauses 17 to 19, wherein the prioritisation information comprises at least one of: a carrier frequency, a carrier bandwidth, a Quality of Service constraint for carrier data, a service type for carrier data and a type of transmission entity associated with the component carrier.

21. The UE as claimed in clause 20, wherein the type of transmission entity is one of: an eNodeB; a picocell base station; a femtocell base station; and a WiFi access point.

22. An eNodeB comprising the soft buffer management circuitry of clause 1 and the soft buffer.

23. The eNodeB as claimed in clause 22 or clause 23, wherein the control circuitry is configured to partition an available soft buffer memory capacity into a number of buffer partitions equal to min (Nc, $N^{DL/UL}_{cells}$), where Nc is a number of soft buffer partitions set to allow prioritization of soft buffer storage for a subset of the plurality of configured component carriers.

24. The eNodeB as claimed in clause 22 or clause 23, wherein the number $N_C$ of soft buffer partitions is either preconfigured for the eNodeB or is signalled to the eNodeB from a higher network layer.

25. The eNodeB as claimed in any one of clauses 22 to 24, wherein the prioritisation information comprises at least one of: a carrier frequency, a carrier bandwidth, a Quality of Service constraint for carrier data, a service type for carrier data and a type of transmission entity associated with the component carrier.

26. The eNodeB as claimed in clause 25, wherein the type of transmission entity is one of: an eNodeB; a picocell base station; a femtocell base station; and a WiFi access point.

27. A method of managing storage of soft bits in a soft buffer for a soft decoding process in a wireless communication system, the method comprising:
receiving from transceiver circuitry in a wireless communication device, control information corresponding to an aggregated carrier comprising a plurality of configured component carriers;
associating with each of the plurality of configured component carriers a carrier preference ranking depending upon a characteristic associated with the respective component carrier obtained from the control information, to identify a preferred subset of component carriers having a higher carrier preference ranking and a less-preferred subset of component carriers having a lower carrier preference ranking;
allocating storage of soft bits in the soft buffer using the carrier preference ranking to provide preferential storage of soft bits in the soft buffer for the preferred subset of component carriers and to provide opportunistic access to the less-preferred subset of component carriers for storage of soft bits, the opportunistic access being permitted when the soft buffer storage capacity is not required by the preferred subset of carriers.

28. The method of clause 27, wherein the soft buffer comprises a number of partitions equal to min ($N_C$, $N^{DL/UL}_{cells}$), wherein Nc is a preferred number of buffer partitions and wherein $N_C$ is set to differ from $N^{DL/UL}_{cells}$ such that soft buffer storage is unequally divided between the plurality of configured component carriers.

29. The method of clause 27, wherein the preferred subset of carriers is selected depending upon Quality of Service constraints associated with information being communicated the respective carrier such that carriers having stricter Quality of Service constraints are selected for inclusion in the preferred subset of carriers.

30. A non-transitory computer-readable medium comprising program instructions to cause a processor, upon execution of the instructions to perform the method of any one of clauses 27 to 29.

31. Soft buffer management circuitry for use in a device of a wireless communication system, the circuitry comprising:
input circuitry configured to obtain a value Nc specifying a number of carriers for which soft buffer storage is to be prioritised and to receive from a receiver in the device, a value $N^{DL/UL}_{cells}$, specifying a number of configured component carriers of an aggregated carrier; and
control circuitry coupled to the input circuitry and configured to partition a soft buffer into min ($N_C$, $N^{DL/UL}_{cells}$) partitions and to map the partitions to respective configured component carriers, wherein the control circuitry is configurable to set NC to prioritise a subset of the configured component carriers.

32. The soft buffer management circuitry of clause 31, wherein the control circuitry is configured to map configured component carriers of the aggregated carrier to the min ($N_C$, $N^{DL/UL}_{cells}$) partitions depending upon carrier index values corresponding to the configured component carriers, the carrier index values being used to select the prioritised subset of configured component carriers.

33. Soft buffer management circuitry for use in a device of a wireless communication system, the circuitry comprising:
means for receiving prioritisation information corresponding to an aggregated carrier comprising a plurality, $N^{DL/UL}_{cells}$, of configured component carriers;
means for controlling storage in a soft buffer of soft channel bits for a decoding process corresponding to two or more of the plurality of configured component carriers by prioritising allocation of storage locations in the soft buffer depending upon a carrier index value corresponding to a respective component carrier, the carrier index value depending upon the prioritisation information.

34. A computer readable medium comprising instructions, which, when executed, cause a processor to carry out the method of any one of clauses 27 to 29.

35. The computer readable medium of clause 34, the medium being one of a storage medium and a transmission medium.

36. Soft buffer management circuitry, substantially as hereinbefore described with reference to the accompanying drawings.

37. A UE, substantially as hereinbefore described with reference to the accompanying drawings.

38. An eNodeB, substantially as hereinbefore described with reference to the accompanying drawings.

39. A method, substantially as hereinbefore described with reference to the accompanying drawings.

The invention claimed is:

1. Soft buffer management circuitry for use in a device of a wireless communication system, the circuitry comprising:
input circuitry to receive from transceiver circuitry in the device, prioritisation information corresponding to an aggregated carrier comprising a plurality of configured component carriers that respectively correspond to a plurality of configured serving cells on an uplink or downlink;
control circuitry to control storage in a soft buffer of soft channel bits for a decoding process corresponding to two or more of the plurality of configured component carriers by prioritising allocation of storage locations in the soft buffer depending upon a carrier index value corresponding to a respective component carrier, the carrier index value depending upon the prioritisation information,
wherein the device is to store received soft channel bits corresponding to a range of at least $w_k^c, w_{k+1}^c, \ldots, w_{mod(k+n_{SB}-1, N_{cb})}^c$, where $$n_{SB} = \min\left(N_{cb}, \left\lfloor \frac{N'_{soft}}{C * \min(N_{cells}^{DL/UL}, N_C) * K_{MIMO} * \min(M_{DL_{HARQ}}, M_{limit})} \right\rfloor \right),$$

C is a number of code blocks, $N_{cb}$ is a soft buffer size for a code block, $K_{MIMO}$ is equal to 1 or 2, $M_{limit}$ is equal to 8, $M_{DL\_HARQ}$ is a maximum number of downlink hybrid automatic repeat request (HARQ) processes, $N'_{soft}$ is a total number of soft channel bits according to a user equipment (UE) category, $N_{cells}^{DL/UL}$ is equal to the plurality of configured serving cells on the uplink or downlink, and Nc is a buffer partition parameter.

2. The soft buffer management circuitry of claim 1, wherein the control circuitry is to use the carrier index value to distinguish between at least two different prioritisation categories of component carrier.

3. The soft buffer management circuitry of claim 2, wherein the control circuitry is to allocate at least one configured component carrier guaranteed access to storage locations in the soft buffer and to allocate at least one configured component carrier opportunistic access to storage locations in the soft buffer, wherein allocation of guaranteed access or opportunistic access depends upon the different prioritisation categories of the component carriers.

4. The soft buffer management circuitry of claim 1, wherein the control circuitry is to divide the soft buffer into a plurality of buffer partitions, where the plurality is equal to $\min(N_{cells}^{DL/UL}, N_C)$.

5. The soft buffer management circuitry of claim 4, wherein the buffer partition parameter $N_C$ specifies a number of prioritised component carriers of the aggregated carrier for which storage in the soft buffer of at least some soft bits corresponding to the respective component carrier is to be guaranteed whereas non-prioritised component carriers of the aggregated carrier are allocated storage in the soft buffer only when not currently required by one or more of the prioritised component carriers.

6. The soft buffer management circuitry of claim 5, wherein the number $N_C$ of prioritised component carriers is configured via Radio Resource Control signalling.

7. The soft buffer management circuitry of claim 4, wherein $N_C < N_{cells}^{DL/UL}$ and wherein a prioritised subset of component carriers is mapped to the $N_C$ buffer partitions providing guaranteed access for that subset of component carriers and wherein a remaining subset of $(N_{cells}^{DL/UL} - N_C)$ component carriers is provided with opportunistic access to storage in memory partitions mapped to the prioritised subset of component carriers.

8. The soft buffer management circuitry of claim 7, wherein the prioritised subset of $N_C$ component carriers is selected based upon carrier index values for the plurality of configured component carriers.

9. The soft buffer management circuitry of claim 8, wherein the prioritised subset of component carriers corresponds to carriers having non-contentious access and the remaining subset of carriers corresponds to carriers having contentious access.

10. The soft buffer management circuitry of claim 1, wherein the control circuitry is to prioritise allocation of storage locations of the soft buffer for a particular carrier index depending upon a rate matching index of the soft bits of the corresponding component carrier and wherein the rate matching index indicates a bit index in a rate matching buffer for a corresponding component channel.

11. The soft buffer management circuitry of claim 1, wherein the control circuitry is to implement a soft-bit replacement policy in the soft buffer such that an incoming soft bit replaces a currently-stored soft bit depending upon relative values of the carrier indices for an incoming soft bit and a currently-stored soft bit.

12. The soft buffer management circuitry of claim 1, wherein the aggregated carrier corresponds to one of PDSCH and PUSCH.

13. A UE comprising the soft buffer management circuitry of claim 1 and the soft buffer.

14. The UE as claimed in claim 13, wherein the prioritisation information comprises a carrier frequency, a carrier bandwidth, a Quality of Service constraint for carrier data, a service type for carrier data, or a type of transmission entity associated with the component carrier.

15. The UE as claimed in claim 14, wherein the type of transmission entity is an eNodeB; a picocell base station; a femtocell base station; or a WiFi access point.

16. An eNodeB comprising the soft buffer management circuitry of claim 1 and the soft buffer.

17. One or more non-transitory, computer-readable media having instructions that, when executed, cause a device to:
receive from transceiver circuitry in a wireless communication device, control information corresponding to an aggregated carrier comprising a plurality of configured component carriers that respectively correspond to a plurality of configured serving cells on an uplink or downlink;
associate with each of the plurality of configured component carriers a carrier preference ranking depending upon a characteristic associated with the respective component carrier obtained from the control information, to identify a preferred subset of component carriers having a higher carrier preference ranking and a less-preferred subset of component carriers having a lower carrier preference ranking;

allocate storage of soft bits in a soft buffer using the carrier preference ranking to provide preferential storage of soft bits in the soft buffer for the preferred subset of component carriers and to provide opportunistic access to the less-preferred subset of component carriers for storage of soft bits, the opportunistic access being permitted when the soft buffer storage capacity is not required by the preferred subset of carriers, wherein the device is to store received soft channel bits corresponding to a range of at least $w_k^c, w_{k+1}^c, \ldots, w_{mod(k+n_{SB}-1,N_{cb})}^c$, where $$n_{SB} = \min\left(N_{cb}, \left\lfloor \frac{N'_{soft}}{C * \min(N_{cells}^{DL/UL}, N_C) * K_{MIMO} * \min(M_{DL_{HARQ}}, M_{limit})} \right\rfloor\right),$$

C is a number of code blocks, $N_{cb}$ is a soft buffer size for a code block, $K_{MIMO}$ is equal to 1 or 2, $M_{limit}$ is equal to 8, $M_{DL\_HARQ}$ is a maximum number of downlink hybrid automatic repeat request (HARQ) processes, $N'_{soft}$ is a total number of soft channel bits according to a user equipment (UE) category, $N_{cells}^{DL/UL}$ is equal to the plurality of configured serving cells on the uplink or downlink, and Nc is a buffer partition parameter.

18. The one or more computer-readable media of claim 17, wherein the soft buffer comprises a number of partitions equal to $(N_{cells}^{DL/UL}, N_C)$, wherein $N_C$ is set to differ from $N_{cells}^{DL/UL}$ such that soft buffer storage is unequally divided between the plurality of configured component carriers.

19. The one or more computer-readable media of claim 17, wherein the preferred subset of carriers is selected depending upon Quality of Service constraints associated with information being communicated to the respective carrier such that carriers having stricter Quality of Service constraints are selected for inclusion in the preferred subset of carriers.

20. Soft buffer management circuitry for use in a device of a wireless communication system, the circuitry comprising:

input circuitry to obtain a value Nc specifying a number of carriers for which soft buffer storage is to be prioritised and to receive from a receiver in the device, a value $N_{cells}^{DL/UL}$, specifying a number of configured serving cells on an uplink or cells downlink, the number of configured serving cells respectively corresponding to a number of configured component carriers of an aggregated carrier; and control circuitry coupled to the input circuitry and to partition a soft buffer into min $(N_C, N_{cells}^{DL/UL})$ partitions and to map the partitions to respective configured component carriers, wherein the control circuitry is configurable to set $N_C$ to prioritise a subset of the configured component carriers, wherein the device is to store received soft channel bits corresponding to a range of at least $w_k^c, w_{k+1}^c, \ldots, w_{mod(k+n_{SB}-1,N_{cb})}^c$, where $$n_{SB} = \min\left(N_{cb}, \left\lfloor \frac{N'_{soft}}{C * \min(N_{cells}^{DL/UL}, N_C) * K_{MIMO} * \min(M_{DL_{HARQ}}, M_{limit})} \right\rfloor\right),$$

C is a number of code blocks, $N_{cb}$ is a soft buffer size for a code block, $K_{MIMO}$ is equal to 1 or 2, $M_{limit}$ is equal to 8, $M_{DL\_HARQ}$ is a maximum number of downlink hybrid automatic repeat request (HARQ) processes, $N'_{soft}$ is a total number of soft channel bits according to a user equipment (UE) category, and Nc is a buffer partition parameter.

21. The soft buffer management circuitry of claim 20, wherein the control circuitry is to map configured component carriers of the aggregated carrier to the min $(N_C, N_{cells}^{DL/UL})$ depending upon carrier index values corresponding to the configured component carriers, the carrier index values being used to select the prioritised subset of configured component carriers.

22. Soft buffer management circuitry for use in a device of a wireless communication system, the circuitry comprising:

means for receiving prioritisation information corresponding to an aggregated carrier comprising a plurality of configured component carriers that respectively correspond to a plurality of configured serving cells on an uplink or downlink;

means for controlling storage in a soft buffer of soft channel bits for a decoding process corresponding to two or more of the plurality of configured component carriers by prioritising allocation of storage locations in the soft buffer depending upon a carrier index value corresponding to a respective component carrier, the carrier index value depending upon the prioritisation information, wherein the device is to store received soft channel bits corresponding to a range of at least $w_k^c, w_{k+1}^c, \ldots, w_{mod(k+n_{SB}-1,N_{cb})}^c$, where $$n_{SB} = \min\left(N_{cb}, \left\lfloor \frac{N'_{soft}}{C * \min(N_{cells}^{DL/UL}, N_C) * K_{MIMO} * \min(M_{DL_{HARQ}}, M_{limit})} \right\rfloor\right),$$

C is a number of code blocks, $N_{cb}$ is a soft buffer size for a code block, $K_{MIMO}$ is equal to 1 or 2, $M_{limit}$ is equal to 8, $M_{DL\_HARQ}$ is a maximum number of downlink hybrid automatic repeat request (HARQ) processes, $N'_{soft}$ is a total number of soft channel bits according to a user equipment (UE) category, $N_{cells}^{DL/UL}$ is equal to the plurality of configured serving cells on the uplink or downlink, and Nc is a buffer partition parameter.

\* \* \* \* \*